(12) United States Patent
Oka et al.

(10) Patent No.: US 9,008,476 B2
(45) Date of Patent: Apr. 14, 2015

(54) POLARIZATION CONVERSION DEVICE

(71) Applicant: Fujikura Ltd., Koto-ku, Tokyo (JP)

(72) Inventors: Akira Oka, Sakura (JP); Kazuhiro Goi, Sakura (JP); Kensuke Ogawa, Sakura (JP); Hiroyuki Kusaka, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 14/314,827

(22) Filed: Jun. 25, 2014

(65) Prior Publication Data

US 2015/0003782 A1 Jan. 1, 2015

(30) Foreign Application Priority Data

Jun. 27, 2013 (JP) ................. 2013-135491

(51) Int. Cl.
*G02B 6/26* (2006.01)
*G02B 6/28* (2006.01)
*G02B 6/27* (2006.01)

(52) U.S. Cl.
CPC ............ *G02B 6/2804* (2013.01); *G02B 6/2726* (2013.01)

(58) Field of Classification Search
CPC ............... G02B 6/125; G02B 6/12007; G02B 2006/12147; G02B 6/26
USPC .................... 385/15, 31, 39, 42, 49
See application file for complete search history.

(56) References Cited

U.S. PATENT DOCUMENTS 7,565,041 B2 *   7/2009   Little et al. ............... 385/11
8,150,219 B2 *   4/2012   Nasu et al. ................ 385/11

OTHER PUBLICATIONS

Liu Liu, et al., "Silicon-on-insulator polarization splitting and rotating device for polarization diversity circuits," Optics Express, Jun. 2011, pp. 12646-12651, vol. 19, No. 13.
P. Dong et al., "112-Gb/s Monolithic PDM-QPSK Modulator in Silicon," European Conference and Exhibition on Optical Communication, Jun. 2012, vol. 1, p. Th.3.B.1.
C. Doerr et al., "Packaged Monolithic Silicon 112-Gb/s Coherent Receiver," IEEE Photonics Technology Letters, Jun. 2011, pp. 762-764, vol. 23, No. 12.
Qing Fang, et al., "Suspended optical fiber-to-waveguide mode size converter for silicon photonics," Optics Express, Apr. 2010, pp. 7763-7769, vol. 18, No. 8.
Hiroshi Fukuda et al., "Silicon photonic circuit with polarization diversity," Optics Express, Mar. 2008, pp. 4872-4880, vol. 16, No. 7.

\* cited by examiner

*Primary Examiner* — Jennifer Doan
(74) *Attorney, Agent, or Firm* — Sughrue Mion, PLLC

(57) ABSTRACT

A polarization conversion device includes: a directional coupler that includes an input side optical waveguide and an output side optical waveguide which are disposed in parallel to each other and each of which has a core. Assuming that a direction in which the input side optical waveguide and the output side optical waveguide face each other is a width direction and a direction perpendicular to the width direction is a height direction in a cross section perpendicular to a longitudinal direction of each of the input side optical waveguide and the output side optical waveguide, and the directional coupler is configured to couple first light guided through the input side optical waveguide to second light guided through the output side optical waveguide, the polarization direction of the second light is perpendicular to that of the first light.

13 Claims, 14 Drawing Sheets

POLARIZATION CONVERSION DEVICE

BACKGROUND OF THE INVENTION

1. Field of the Invention

The present invention relates to an optical waveguide element. In particular, the invention relates to a polarization conversion device that is a device for performing polarization conversion for a substrate-type optical waveguide element used in optical fiber communication.

Priority is claimed on Japanese Patent Application No. 2013-135491, filed on Jun. 27, 2013, the content of which is incorporated herein by reference.

2. Description of Related Art

In recent years, the amount of information used in optical communication has been increasing. In order to respond to such an increase in the amount of information, the measures have been taken for an increase in the signal speed, an increase in the number of channels by using wavelength division multiplexing, and the like. In particular, in digital coherent technology of the next generation 100 Gbps (gigabit per second) for high-speed information communication, in order to double the amount of information per unit time, a polarization multiplexing scheme for carrying information in each of two polarized waves having electric fields perpendicular to each other is used. However, modulation schemes for high-speed communication including the polarization multiplexing scheme require a complex optical modulator. For this reason, problems, such as a device size increase and a cost increase, occur. In order to solve such problems, an optical modulator having a substrate-type optical waveguide using silicon, which is advantageous in terms of easy processing, size reduction by integration, and cost reduction by mass production, has been studied.

However, the polarization multiplexing in the substrate-type optical waveguide has the following problems. In general, the substrate-type optical waveguide has a shape in which the width direction parallel to the substrate and the height direction perpendicular to the substrate are asymmetrical. For this reason, in two types of polarization modes of a mode in which an electric field component in the width direction is a main component (hereinafter, referred to as a TE mode) and a mode in which an electric field component in the height direction is a main component (hereinafter, referred to as a TM mode), the characteristics, such as an effective refractive index, are different. In many cases, a fundamental TE mode and a fundamental TM mode of these modes are used. Here, the fundamental TE mode refers to a mode having a largest effective refractive index of the TE modes, and the fundamental TM mode refers to a mode having a largest effective refractive index of the TM modes.

It is difficult to perform an optical modulation operation for these modes having different characteristics with a single substrate-type optical waveguide element. When using a substrate-type optical waveguide element optimized for each mode, in order to develop a substrate-type optical waveguide element for each mode, a lot of effort is required in terms of development.

As a method for solving this problem, a method can be mentioned in which a substrate-type optical waveguide element optimized for a desired fundamental TE mode is manufactured, the fundamental TE mode is used as the input, and the output is polarization-converted to the fundamental TM mode. The polarization conversion herein indicates a conversion from the fundamental TE mode to the fundamental TM mode or a conversion from the fundamental TM mode to the fundamental TE mode. In order to perform a polarization conversion operation, a substrate-type optical waveguide element for performing polarization conversion on the substrate is required.

As a technique for performing such polarization conversion on the substrate, there is a method of performing polarization conversion from the fundamental TE mode to the fundamental TM mode by coupling the fundamental TM mode input to one waveguide of a directional coupler to the fundamental TE mode of the other waveguide. Such a known technique is disclosed in Liu Liu, et al., "Silicon-on-insulator polarization splitting and rotating device for polarization diversity circuits," Optics Express, Vol. 19, No. 13, pp. 12646-12651 (2011) (hereinafter, referred to as Non-patent Document 1). In Non-patent Document 1, a fundamental TM mode is input to one waveguide, and a fundamental TE mode is coupled to the other waveguide. Embodiments of the invention to be described later are not limited to the process of converting the fundamental TM mode to the fundamental TE mode but are focused on the reverse process, that is, on a structure of outputting the input fundamental TE mode as the fundamental TM mode. This is the same phenomena in passive waveguide elements.

The optical waveguide element shown in FIG. 1 of Non-patent Document 1 is a directional coupler and is formed by two parallel waveguides having the same height and different widths. In the directional coupler, a cross section (refractive index cross section) perpendicular to the longitudinal direction of each waveguide is formed by a lower clad, a rectangular core formed on the lower clad, and an upper clad that covers the lower clad and the core. The directional coupler of Non-patent Document 1 has a vertically asymmetrical structure in which the lower clad and the upper clad have different refractive indices. Each waveguide width is set such that the effective refractive index of the fundamental TE mode guided through the narrow waveguide and the effective refractive index of the fundamental TM mode guided through the wide waveguide become sufficiently close values.

When the refractive index cross section is vertically symmetrical, the amplitude direction of the main electric field of the fundamental TE mode is perpendicular to that of the fundamental TM mode. Therefore, in order to realize coupling using a directional coupler, it is required that the coupling length be sufficiently large and the effective refractive indices of the two modes be exactly the same. For this reason, in Non-patent Document 1, the upper and lower sides of the refractive index cross sections are made to be asymmetrical. In this case, a light confinement direction is tilted, and the number of components perpendicular to the main electric field component is increased for each mode. This enhances the coupling between the fundamental TE mode and the fundamental TM mode.

In order to make the upper and lower sides of the refractive index cross section asymmetrical, materials having different refractive indices are required for the upper clad and the lower clad. The need for new materials is disadvantageous in terms of effectiveness and cost because an extra process may occur or materials, which are not used in other optical waveguide portions originally, may be required.

In Non-patent Document 1, by using air for the upper clad and silica ($SiO_2$) for the lower clad, "requiring no additional and nonstandard fabrication steps" is realized. In this case, since the optical waveguide is exposed during the manufacturing process, the characteristics are degraded due to adhesion of foreign matter. As a result, the yield is reduced.

SUMMARY OF THE INVENTION

The invention has been made in view of the above-described situation, and it is an object of the invention to provide a polarization conversion device capable of performing polarization conversion efficiently within a shorter distance even if the refractive index difference between the upper clad and the lower clad is small.

In order to solve the above-described problem, according to a first aspect of the invention, there is provided a polarization conversion device including a directional coupler that includes an input side optical waveguide and an output side optical waveguide which are disposed in parallel to each other and each of which has a core. Assuming that a direction in which the input side optical waveguide and the output side optical waveguide face each other is a width direction and a direction perpendicular to the width direction is a height direction in a cross section perpendicular to a longitudinal direction of each of the input side optical waveguide and the output side optical waveguide, a size of the core of the input side optical waveguide in the height direction is the same as a size of the core of the output side optical waveguide in the height direction. The core of at least one of the input side optical waveguide and the output side optical waveguide is configured to include a rectangular lower core and a rectangular upper core which is disposed on the lower core such that one side surface of the upper core and one side surface of the lower core in the width direction are flush with each other and of which a size in the width direction is smaller than that of the lower core. The directional coupler is configured to couple first light guided through the input side optical waveguide to second light guided through the output side optical waveguide, the polarization direction of the second light is perpendicular to that of the first light.

The core of one optical waveguide of the input side optical waveguide and the output side optical waveguide may be configured to include the lower core and the upper core, and the core of the other optical waveguide is a rectangular core.

The other optical waveguide may be present on a side where side ends of the lower core and the upper core in the width direction in the one optical waveguide match each other.

The polarization conversion device further may include an optical waveguide that is disposed at least one end of the other optical waveguide in the longitudinal direction and that has a tapered core whose size in the width direction changes gradually.

Each of the input side optical waveguide and the output side optical waveguide may have the core configured to include the lower core and the upper core.

The input side optical waveguide and the output side optical waveguide may be disposed such that the side surface, which is flush with the lower core and the upper core, in the input side optical waveguide faces the side surface, which is flush with the lower core and the upper core, in the output side optical waveguide.

The polarization conversion device further may include a curved waveguide disposed at least one end of each of the input side optical waveguide and the output side optical waveguide in the longitudinal direction, and the curved waveguide connected to the input side optical waveguide and the curved waveguide connected to the output side optical waveguide become closer to each other toward the directional coupler or more separated from each other as a distance from the directional coupler increases.

Preferably, the polarization conversion device further may include an optical waveguide which has a core that is disposed at least one end of the optical waveguide including the lower core and the upper core in the longitudinal direction and in which widths of the lower core and the upper core become gradually equal.

A fundamental TE mode may be input to the input side optical waveguide and the output side optical waveguide, and an absolute value of a difference between an effective refractive index of the fundamental TE mode guided through the input side optical waveguide and an effective refractive index of the fundamental TE mode guided through the output side optical waveguide may be equal to or greater than 0.2.

The polarization conversion device further may include a substrate having a top surface on which the input side optical waveguide and the output side optical waveguide are formed, and the input side optical waveguide and the output side optical waveguide may be disposed such that the width direction becomes a direction parallel to the top surface of the substrate and the height direction becomes a direction perpendicular to the top surface of the substrate.

According to a second aspect of the invention, there is provided a DP-QPSK modulator including the polarization conversion device described above.

According to a third aspect of the invention, there is provided a polarization diversity coherent receiver including the polarization conversion device described above.

According to a fourth aspect of the invention, there is provided a polarization diversity scheme including the polarization conversion device described above.

According to the above aspects of the invention, the core of at least one optical waveguide of the directional coupler is configured to include the upper core and the lower core having different widths, and has a vertically asymmetrical core shape. Therefore, even if the refractive index difference between the upper clad and the lower clad is small, it is possible to perform polarization conversion efficiently within a shorter distance.

DETAILED DESCRIPTION OF THE INVENTION

Hereinafter, the invention will be described through preferred embodiments with reference to the accompanying diagrams.

Figure 1:
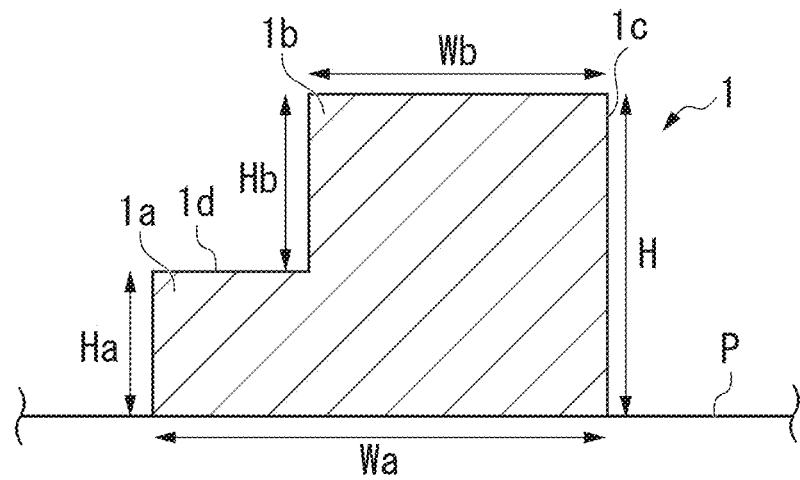
FIG. 1 is a cross-sectional view showing an example of an optical waveguide core including a lower core and an upper core that is used in an embodiment of the invention.

A polarization conversion device of the present embodiment includes an input side optical waveguide and an output side optical waveguide parallel to each other that form a directional coupler. In addition, when light guided through the input side optical waveguide is coupled to light guided through the output side optical waveguide, light beams of modes having different polarization directions can also be coupled to each other. A core of at least one of the input side optical waveguide and the output side optical waveguide of the directional coupler has a stepped core 1 in a cross section perpendicular to the guiding direction as shown in FIG. 1. The stepped core 1 includes a rectangular lower core 1a and an upper core 1b that is disposed on the lower core 1a such that one side end (side surface) 1c in a width direction matches one side end (side surface) 1c of the lower core 1a (that is, one side surface of the lower core 1a and one side surface of the upper core 1b are flush with each other) and that has a size in the width direction smaller than the lower core 1a. In this case, it is possible to increase the coupling efficiency between the fundamental TE mode and the fundamental TM mode by rotating the electric field of at least one the light of the fundamental TE mode and the light of the fundamental TM mode. Thus, it is possible to realize the vertical asymmetry through the stepped core shape without changing the refractive indices of the upper clad and the lower clad. As a result, it is possible to perform polarization conversion efficiently with shorter distance.

Figure 2:
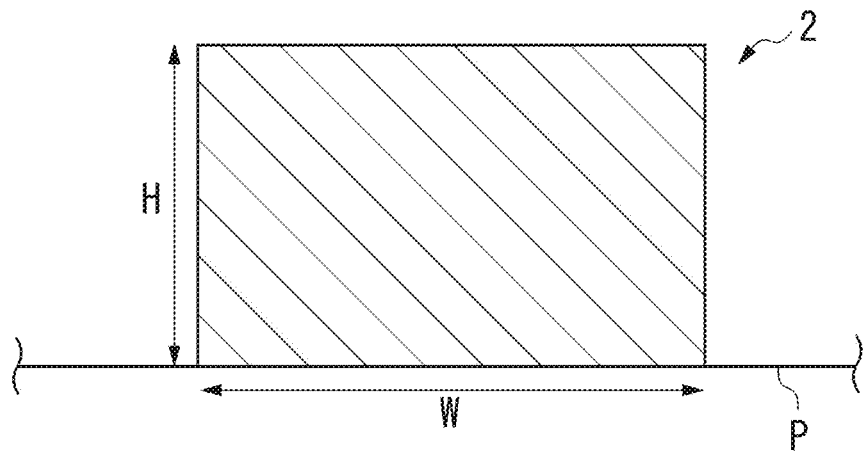
FIG. 2 is a cross-sectional view showing an example of a rectangular optical waveguide core used in the embodiment of the invention.

When only the core of one optical waveguide is made to have a stepped core shape as shown in FIG. 1, the other core may be a rectangular core 2 (rectangular waveguide) in a cross section perpendicular to the guiding direction as shown in FIG. 2.

It is preferable that the height H of the core of the input side optical waveguide be equal to that of the output side optical waveguide. The height H of the core is the entire height including the lower core 1a and the upper core 1b in the case of the stepped core 1 shown in FIG. 1, and is the height of the core in the case of the rectangular core 2 shown in FIG. 2. When the input side optical waveguide and the output side optical waveguide are formed on the top surface P of the substrate, the width W, Wa, and Wb is the size in a direction parallel to the top surface P of the substrate in a cross-sectional view perpendicular to the guiding direction, and the height H, Ha, and Hb is the size in a direction perpendicular to the top surface of the substrate P. In FIG. 1, the width Wb of the upper core 1b is smaller than the width Wa of the lower core 1a, and a step portion 1d corresponding to the difference between the width of the lower core 1a and the width of the upper core 1b is formed on the opposite side of the side end 1c. The position of the substrate P shown in FIG. 1 indicates the top surface of the lower clad. An upper clad is formed on the lower clad and around the top surface and both side ends of the core.

The relationship between the height Ha of the lower core 1a and the height Hb of the upper core 1b is not limited in particular, and Ha>Hb, Ha=Hb, or Ha<Hb is possible. However, it is preferable that the difference between Ha and Hb be extremely large. The lower core 1a and the upper core 1b are preferably formed of the same material. In the case of the Si core, it is also possible to form the lower core 1a and the upper core 1b from single crystal Si by etching. After forming the lower core 1a from the single crystal Si, the upper core 1b can also be formed of polycrystal Si or the like.

In order for the input side optical waveguide and output side optical waveguide parallel to each other to function as a directional coupler, it is preferable that the effective refractive index of the fundamental TE mode guided through one optical waveguide (first light) and the effective refractive index of the fundamental TM mode guided through the other optical waveguide (second light) be sufficiently close values. More preferably, the effective refractive indices of both the modes are equal.

When the fundamental TE mode input to the input side optical waveguide is coupled to the fundamental TM mode guided through the output side optical waveguide, it is desirable that the effective refractive index of the fundamental TE mode guided through the input side optical waveguide and the effective refractive index of the fundamental TM mode guided through the output side optical waveguide be substantially equal.

In addition, when the fundamental TM mode input to the input side optical waveguide is coupled to the fundamental TE mode guided through the output side optical waveguide, it is desirable that the effective refractive index of the fundamental TM mode guided through the input side optical waveguide and the effective refractive index of the fundamental TE mode guided through the output side optical waveguide be substantially equal.

Next, the reason why the coupling efficiency between the fundamental TE mode and the fundamental TM mode is increased by the shape of the stepped core will be described. Coupling efficiency T of the directional coupler is a ratio of the power in the output mode to the power in the input mode. When two waveguides are spaced apart from each other, the coupling efficiency T is approximately expressed by the following Formula (1).

[Math. 1]

$$T = \frac{\chi^2}{\chi^2 + \delta^2} \sin^2\left(L\sqrt{\chi^2 + \delta^2}\right) \quad (1)$$

Here, $\chi$ is a coupling constant, $\delta$ is a value of the half of the difference in propagation constant when two modes to be coupled to each other are independently guided through the respective waveguides, and L is the length of the directional coupler. The two modes to be coupled to each other are modes having different polarization directions, such as the fundamental TE mode and the fundamental TM mode (polarization direction of the fundamental TE mode is perpendicular to that of the fundamental TM mode). Any mode of the two modes may be used as an input mode or an output mode. For example, the fundamental TE mode may be used as an input mode, and the fundamental TM mode may be used as an output mode.

Focusing on $\chi$, as $\chi$ increases, the coupling efficiency T increases, and the coupling length becomes short. From Formula (1), the coupling efficiency T is divided into the expression $\chi^2/(\chi^2+\delta^2)$ and the expression $\sin^2(L\sqrt{})$. Although "$\chi^2 + \delta^2$" involving a radical sign is omitted herein, "$L\sqrt{}$" means "$L\sqrt{(\chi^2+\delta^2)}$", that is, the expression shown in the following Math. 2.

$$L\sqrt{\chi^2 + \delta^2} \quad [\text{Math. 2}]$$

$\chi^2/(\chi^2+\delta^2)$ increases as $\delta$ approaches 0, and $\delta$ is determined by the effective refractive index determined by the refractive index of the clad/core and the structure of the input side optical waveguide and the output side optical waveguide. Therefore, $\delta$ cannot always be 0 due to manufacturing errors, temperature changes, refractive index changes in a material, and the like. For this reason, in order to increase the coupling efficiency when $\delta$ is not 0, it is preferable that $\chi$ be large. Assuming that the shortest L to maximize the expression $\sin^2(L\sqrt{})$ to 1 is a coupling length $L_c$, $L_c$ is expressed by the following Formula (2).

[Math. 3]

$$L_c = \frac{\pi}{2\sqrt{\chi^2 + \delta^2}} \quad (2)$$

When $\delta$ is close to 0, if $\chi$ is small, $L_c$ is increased. As a result, the directional coupler becomes long. Therefore, it is preferable that $\chi$ be large.

As described above, from Formula (1), it can be seen that the coupling efficiency T is increased if $\chi$ is large, and accordingly, it is possible to realize coupling with shorter distance.

Next, why the coupling constant $\chi$ becomes large by using the embodiment of the invention will be described. The coupling constant $\chi$ has dependence expressed by the following Formula (3).

[Math. 4]

$$\left. \begin{array}{l} \chi \propto \int_{-\infty}^{\infty}\int_{-\infty}^{\infty} (N^2 - N_1^2) E_2^* \cdot E_1 \, dx \, dy \\ \chi \propto \int_{-\infty}^{\infty}\int_{-\infty}^{\infty} (N^2 - N_2^2) E_1^* \cdot E_2 \, dx \, dy \end{array} \right\} \quad (3)$$

Parameters of Formula (3) are defined as follows. Two waveguides are assumed to be a waveguide 1 and a waveguide 2.

$N_1$ is the refractive index distribution of the core cross section when only the waveguide 1 is present. Similarly, $N_2$ can be defined as the refractive index distribution of the core cross section when only the waveguide 2 is present.

N is the refractive index distribution of the core cross section when the waveguides 1 and 2 are present. $E_1$ and $E_2$ are electric field vectors of modes guided through the waveguides 1 and 2, respectively. x is a position in the width direction, and y is a position in the height direction.

According to Formula (3), the coupling constant $\chi$ is determined by the inner product ($E_2^* \cdot E_1$ or $E_1^* \cdot E_2$) of the electric fields of two modes. In this case, the coupling constant $\chi$ increases as the values of the electric field components of the modes guided through the waveguides 1 and 2 become close to each other. As a result, the coupling efficiency T is increased. In the coupling between two modes in which the amplitude directions of the main electric fields are perpendicular to each other, such as the fundamental TE mode and the fundamental TM mode, the coupling constant $\chi$ is increased by rotating the electric field in at least one mode to increase the electric field component in the other mode that is not the main electric field.

For example, for comparison, the electric field distribution of the structure used for the guiding of the fundamental TE mode is calculated under the conditions in which the width and height of the stepped core are the same as those of the rectangular core. In the case of the stepped core shape (FIGS. 10A and 10B) the Ey component (component perpendicular to the main electric field component in the fundamental TE mode) is large and coupling efficiency is increased compared with the case of the rectangular core shape (FIGS. 11A and 11B). This will be described in detail later (refer to a first example). Therefore, it is possible to perform polarization conversion using the directional coupler. In FIGS. 10A to 11B, the X axis is the width direction of the waveguide, and the Y axis is the height direction of the waveguide. In addition, the Ex component is an electric field component in the width direction of the waveguide, and the Ey component is an electric field component in the height direction of the waveguide. The value of the electric field component in the diagrams is a value normalized by the maximum amplitude of the main electric field component.

Figure 10A:
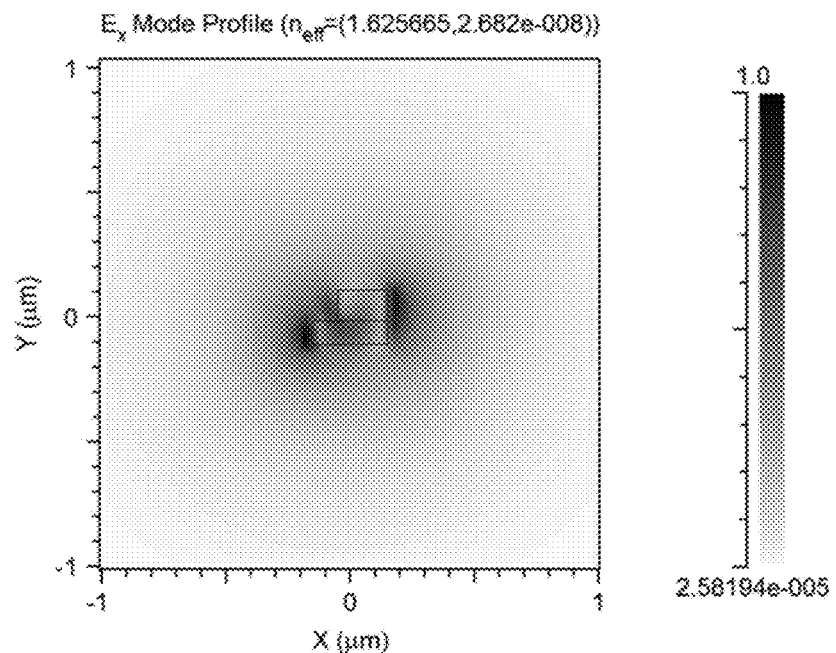
FIG. 10A shows a simulation result that shows an Ex component of the electric field when inputting the fundamental TE mode to an input side optical waveguide having a stepped core of a first example.
Figure 10B:
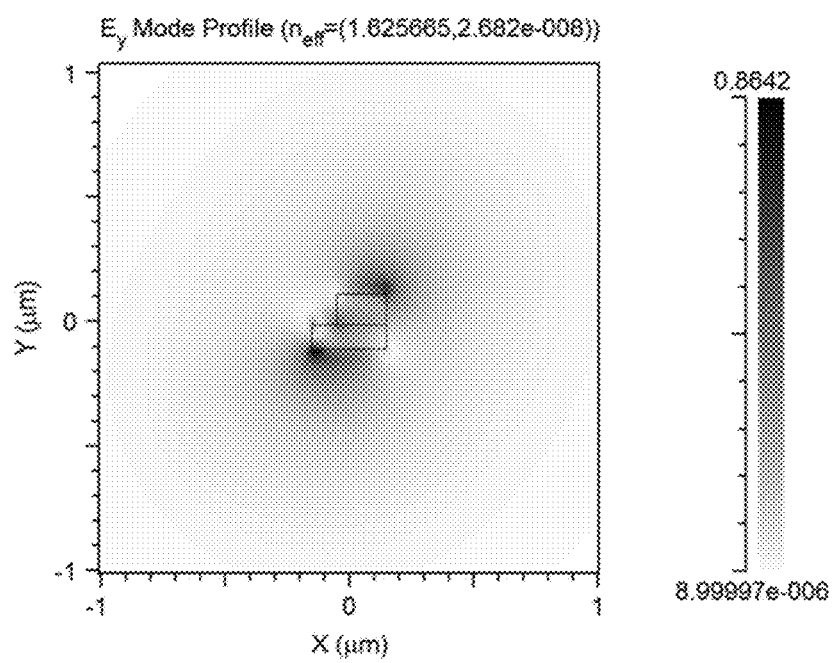
FIG. 10B shows a simulation result that shows an Ey component of the electric field when inputting the fundamental TE mode to the input side optical waveguide having a stepped core of the first example.
Figure 11A:
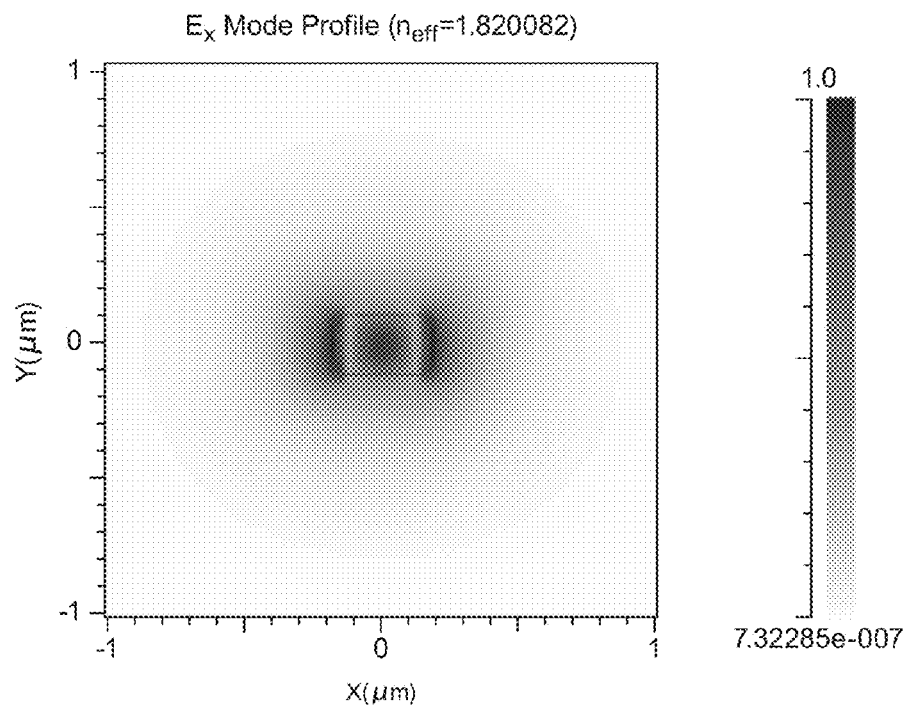
FIG. 11A shows a simulation result that shows an Ex component of the electric field when inputting the fundamental TE mode to an optical waveguide having a rectangular core with the same width as the input side optical waveguide of the first example.
Figure 11B:
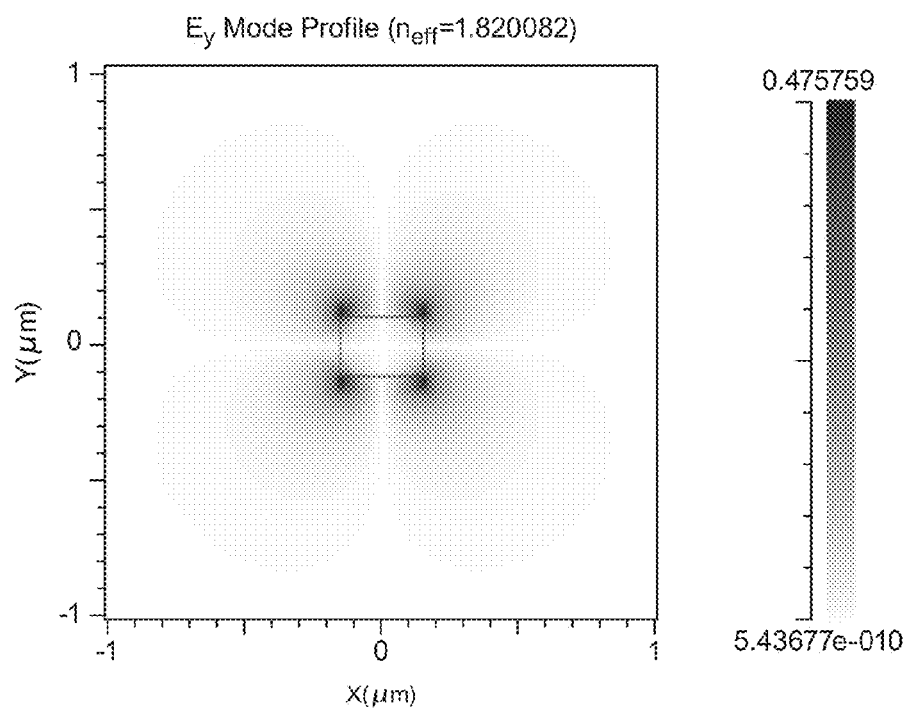
FIG. 11B shows a simulation result that shows an Ey component of the electric field when inputting the fundamental TE mode to the optical waveguide having a rectangular core with the same width as the input side optical waveguide of the first example.
Figure 12A:
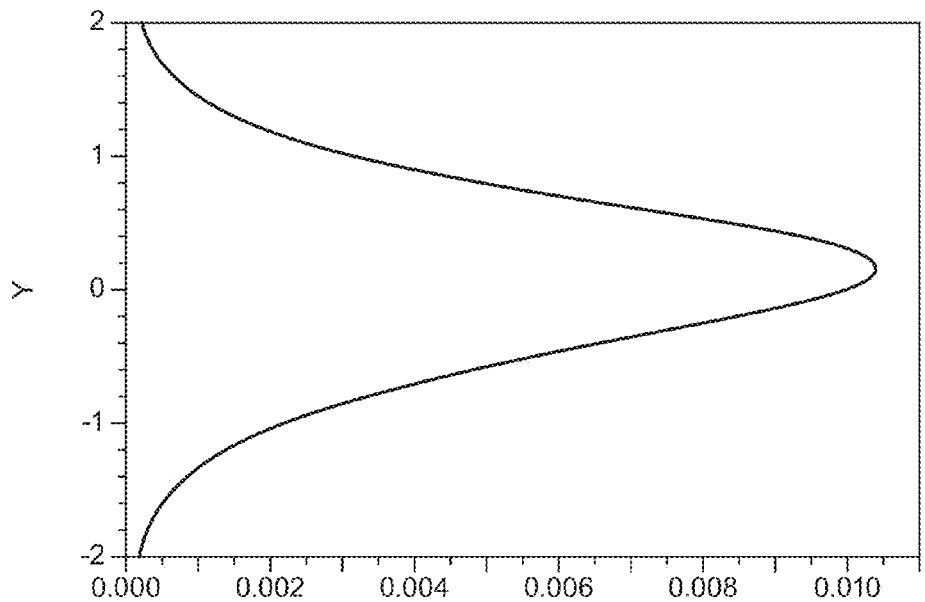
FIG. 12A is a graph showing a value of the Ey component of the electric field at a location, which is 1 μm from the center (X=0) in the +X axis direction (width direction), in the stepped core of FIGS. 10A and 10B.
Figure 12B:
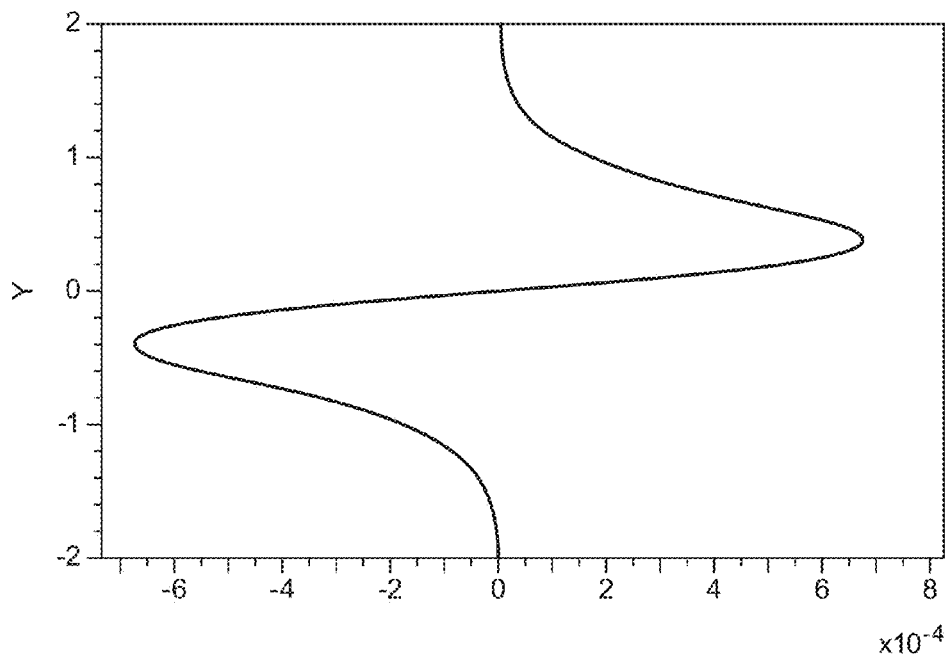
FIG. 12B is a graph showing a value of the Ey component of the electric field at a location, which is 1 μm from the center (X=0) in the +X axis direction (width direction), in the rectangular core of FIGS. 11A and 11B.

FIG. 12A shows a value of the Ey component of the electric field at a location, which is 1 μm from the center (X=0) in the +X axis direction (width direction), in the stepped core of FIGS. 10A and 10B. FIG. 12B shows a value of the Ey component of the electric field at a location, which is 1 μm from the center (X=0) in the +X axis direction (width direction), in the rectangular core of FIGS. 11A and 11B. As in FIGS. 10A, 10B, and 11, the vertical axis (Y) in the graphs of FIGS. 12A and 12B indicates a position (μm) in the height direction of the core. The horizontal axis in FIGS. 12A and 12B indicates the value of the Ey component when the electric field obtained by combining the Ex component and the Ey component is set to 1. From this result, it can be seen that, in the case of the stepped core shape, the electric field is widely distributed at a position away from the center, and accordingly, coupling to the adjacent waveguide is increased.

Next, the manufacturing of the optical waveguide element of the present embodiment will be described. An optical waveguide having a stepped core shape can be manufactured in the same process as when manufacturing a rib waveguide. In the substrate-type optical waveguide, a rib waveguide having a smaller loss than a rectangular waveguide is used together with the rectangular waveguide in many cases. Therefore, the stepped core shape of two steps shown in FIG. 1 can be manufactured without requiring an extra process in many cases. In addition, in the optical waveguide element of the present embodiment, it is possible to use the same material for the upper clad and the lower clad. Therefore, compared with the polarization conversion device for which different materials need to be used as disclosed in Non-patent Document 1, it is possible to simplify the manufacturing process in the present embodiment. In particular, in the optical waveguide according to "silicon on insulator (SOI)", a BOX layer serving as a lower clad is $SiO_2$, and $SiO_2$ is also frequently used for the upper clad. For this reason, in the present embodiment in which the optical waveguide according to the SOI can be used, it is possible to use the same material for the upper clad and the lower clad.

In addition, according to the present embodiment, even when the materials of the upper clad and the lower clad are the same, it is possible to perform polarization conversion that is a conversion between the fundamental TE mode and the fundamental TM mode on the optical waveguide.

In the present embodiment, it is preferable to use materials of the same element for the upper clad and the lower clad. For example, if the lower clad is $SiO_2$, it is preferable to use $SiO_2$ for the upper clad.

Even when there is a refractive index difference between the upper clad and the lower clad that is not large, vertical asymmetry in the stepped core is increased by using the present embodiment. As a result, it is possible to perform polarization conversion efficiently within a shorter distance.

As the case where the refractive index difference is not large, cases where time and effort for the extra process is small can be mentioned. Examples thereof include a case where different materials are used for the upper clad and the lower clad in the other optical waveguide and these materials can also be used for the upper clad and the lower clad in the polarization conversion device and a case where the refractive index difference is obtained by changing the doping conditions in the upper clad and the lower clad whose base materials are the same material. According to the present embodiment, also in these cases, it is possible to perform polarization conversion efficiently on the substrate-type optical waveguide while realizing miniaturization.

When the stepped core is not used, if the refractive index difference between the upper clad and the lower clad is not large as disclosed in Non-patent Document 1 vertical asymmetry is reduced. In this case, since the rotation of the mode does not occur sufficiently, polarization conversion becomes difficult.

When the effective refractive indices of the fundamental TE modes of two optical waveguides that form a directional coupler are different, even if the fundamental TE mode is input to the waveguide to which the fundamental TM mode is output, the input fundamental TE mode is not coupled to the other waveguide but passes through the other waveguide. Therefore, the polarization conversion device of the invention can also be made to function as a polarization beam combiner.

Figure 3:
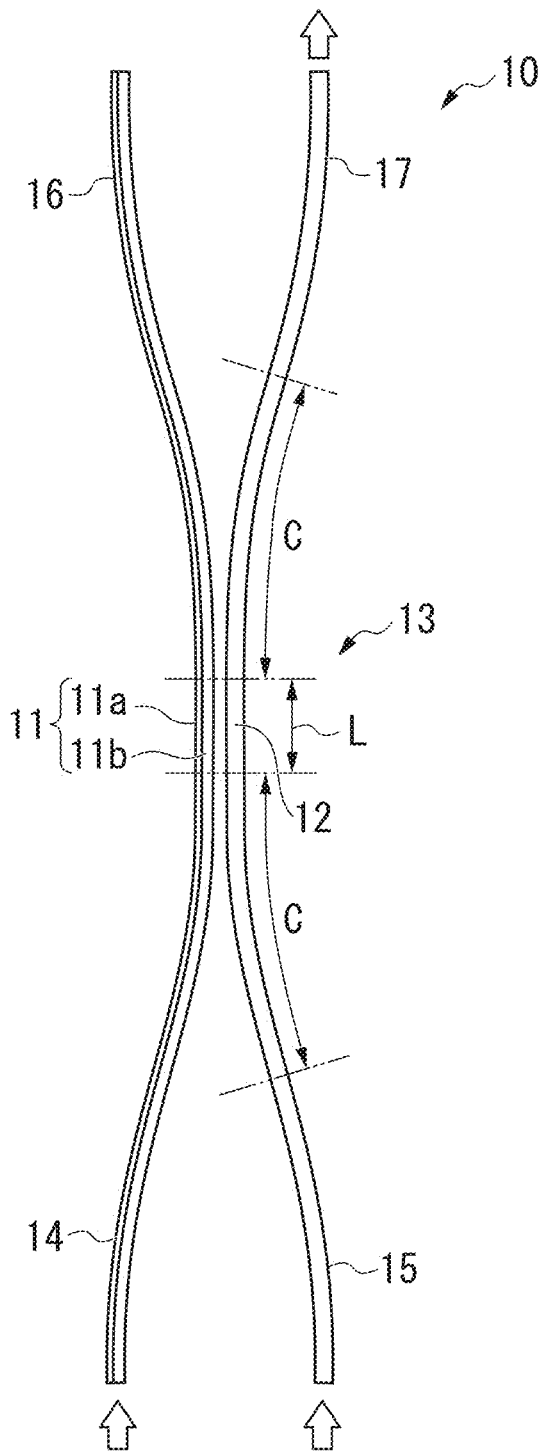
FIG. 3 is a plan view showing an example of a polarization conversion device according to the embodiment of the invention.
Figure 4:
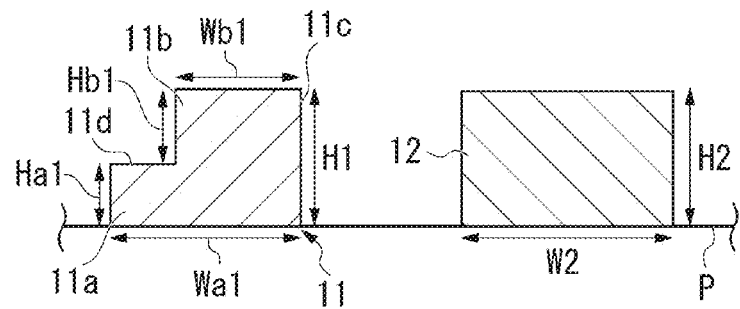
FIG. 4 is a cross-sectional view illustrating a directional coupler of the polarization conversion device according to the embodiment of the invention.

FIG. 3 illustrates the configuration of the polarization conversion device (optical waveguide element 10) of the present embodiment. FIG. 4 shows a cross-sectional view perpendicular to the light guiding direction of a directional coupler 13 in the optical waveguide element 10 shown in FIG. 3.

Before and after the directional coupler 13 in the guiding direction, curved waveguides 14, 15, 16, and 17 are disposed. In the case of FIG. 3, the curved waveguides 14, 15, 16, and 17 are disposed at both ends of an input side optical waveguide 11 and an output side optical waveguide 12 in the longitudinal direction. On the front side in the guiding direction, the curved waveguide 14 connected to the input side optical waveguide 11 and the curved waveguide 15 connected to the output side optical waveguide 12 become closer to each other toward the directional coupler 13. On the back side in the guiding direction, the curved waveguide 16 connected to the input side optical waveguide 11 and the curved waveguide 17 connected to the output side optical waveguide 12 become more separated from each other as a distance from the directional coupler 13 increases. By disposing the curved waveguides 14, 15, 16, and 17 in this manner, the distance between two waveguides before and after the directional coupler 13 is increased. As a result, it is possible to suppress the coupling of light.

The curved waveguides 14, 15, 16, and 17 may be provided on only one of the input side optical waveguide 11 and the output side optical waveguide 12. In addition, the curved waveguides 14, 15, 16, and 17 may be provided at only one end of the front and back ends of the input side optical waveguide 11 or the output side optical waveguide 12. At the end where no curved waveguide is provided, it is possible to extend a waveguide linearly from each waveguide of the directional coupler 13.

In the optical waveguide element 10 shown in FIG. 3, as shown in FIG. 4, only the core of the input side optical waveguide 11 is a stepped core formed by a lower core 11a and an upper core 11b, and the core of the output side optical waveguide 12 is a rectangular core. Therefore, when inputting an input mode, such as the fundamental TE mode, to the input side optical waveguide 11, a waveguide having a rectangular core that is widely used needs to be changed to a waveguide having a stepped core. In this case, a waveguide portion which changes the waveguide to a stepped shape is required compared with a case where the width of the rectangular core is simply changed gradually along the guiding direction. Therefore, in the case of the structure of FIG. 4 in which only one side has a stepped core for polarization, it is possible to realize miniaturization compared with a case where both the input side optical waveguide 11 and output side optical waveguide 12 are formed as stepped cores.

Figure 5:
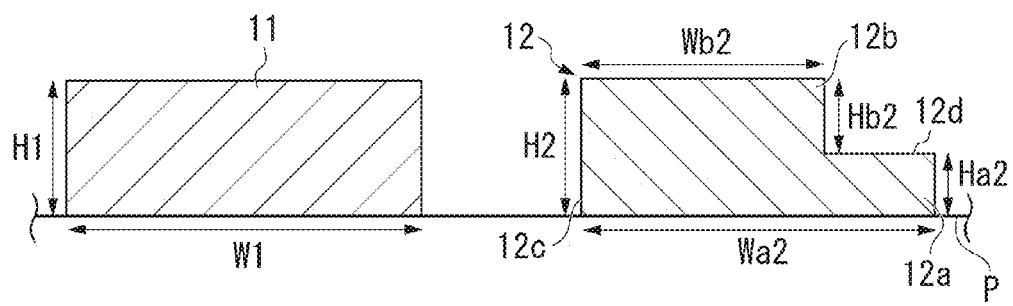
FIG. 5 is a cross-sectional view illustrating a directional coupler of the polarization conversion device according to the embodiment of the invention.

When using a stepped core for the input side optical waveguide 11 as shown in FIG. 4, wave guiding in a portion (in FIG. 3, the curved waveguide 16) other than the linear portion of the directional coupler 13 in the input side optical waveguide 11 is not intended. Therefore, the conversion of the core shape between the rectangular core and the stepped core is performed only once. For this reason, compared with a case where the stepped core is used for the output side optical waveguide 12 as shown in FIG. 5, miniaturization is easy particularly when the polarization conversion device is used as a polarization beam combiner. On the other hand, the size of the waveguide guided through the fundamental TE mode is smaller than that of the waveguide guided through the fundamental TM mode, particularly in the case of a typical substrate-type optical waveguide having a larger waveguide width than the height. Therefore, when the fundamental TE mode is set as an input, the manufacturing of the optical waveguide element, in which a stepped core is used for the input side optical waveguide 11 as shown in FIG. 4, becomes more difficult.

In a directional coupler shown in FIG. 5, in contrast to FIG. 4, the core of the output side optical waveguide 12 is a stepped core formed by a lower core 12a and an upper core 12b, and the core of the input side optical waveguide 11 is a rectangular core. As described above, the size of the waveguide guided through the fundamental TE mode is smaller than that of the waveguide guided through the fundamental TM mode, particularly in the case of a typical substrate-type optical waveguide having a larger waveguide width than the height. Therefore, when the fundamental TE mode is set as an input, manufacturing becomes easy if the output side optical waveguide 12 is manufactured as a stepped core as shown in FIG. 5.

When the optical waveguide element is used only as a polarization conversion device, light is not input to the opposite waveguide (in FIG. 3, the curved waveguide 15) to the output end of the directional coupler 13 in the output side optical waveguide 12. Accordingly, the guiding of light is not intended. Therefore, substantially one structure for converting the stepped core to the rectangular core is required.

When multiplexing another fundamental TE mode (fundamental TE mode') from the opposite side to the output end of the directional coupler 13 in the output side optical waveguide 12, the structure for converting the rectangular core to the stepped core is also required at the input end of the fundamental TE mode'. Therefore, the size of the optical waveguide element becomes larger.

Figure 6:
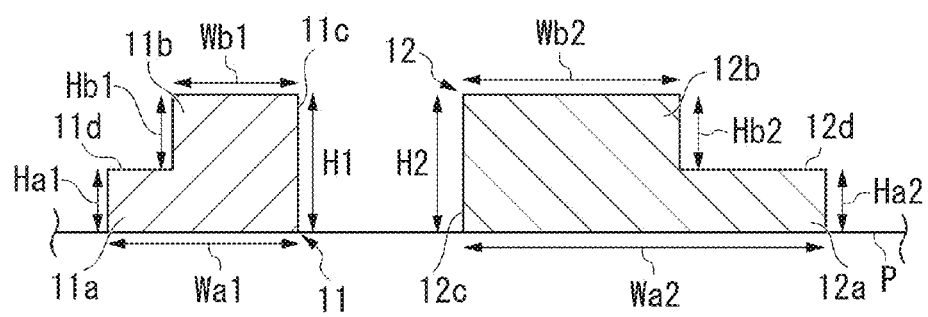
FIG. 6 is a cross-sectional view illustrating a directional coupler of the polarization conversion device according to the embodiment of the invention.

A directional coupler shown in FIG. 6 has a structure in which both the input side optical waveguide 11 and the output side optical waveguide 12 are stepped cores and both the input side mode and the output side mode are rotated. By rotating both the modes, it is possible to further increase the coupling efficiency compared with the cases shown in FIGS. 4 and 5 in which only one waveguide is a stepped core.

In addition, due to manufacturing error of the rib process, the height of the slab (height of the lower core) may be changed independently of the height of the entire waveguide core. Under the influence, in the present embodiment in which both the waveguides are stepped cores, both the core shapes change similarly, and these changes have the effect of the same tendency for the confinement of light. That is, the effect of confining light becomes weak as the size of the core becomes small, and becomes strong as the size of the core becomes large. Therefore, since a change in the effective refractive index of light for light confinement is the same in both waveguides, it is possible to reduce a change in the effective refractive index difference between the two optical waveguides 11 and 12.

As shown in FIGS. 4 and 5, when only one waveguide is formed to have a stepped core, only the stepped core is influenced by a change in the height of the lower core. Accordingly, since only the effective refractive index of the mode guided through the waveguide having a stepped core is changed, the effective refractive index difference between the two optical waveguides 11 and 12 is increased.

If the effective refractive index difference between the two optical waveguides 11 and 12 increases, $\delta$ in Formula (1) described above increases. This is not preferable since the coupling efficiency is reduced.

As shown in FIGS. 4 and 5, when a stepped core is provided in one optical waveguide, it is preferable that the other waveguide be present on a side where the side ends of the lower core and the upper core match each other (side surfaces of the lower core and the upper core flush with each other face the other optical waveguide).

As shown in FIG. 6, when a stepped core is provided in both the optical waveguides, it is preferable that a side where the side ends 11c of the lower core 11a and the upper core 11b match each other and a side where the side ends 12c of the lower core 12a and the upper core 12b match each other be disposed so as to face each other. That is, it is preferable that the side surfaces of the lower core 11a and the upper core 11b flush with each other and the side surfaces of the lower core 12a and the upper core 12b flush with each other be disposed so as to face each other. For the effect of rotating the polarization, the directions of the side ends (side surfaces flush with each other) 11c and 12c that match each other in upper and lower portions of the stepped core and the directions of step portions 11d and 12d do not matter. However, when a low-height waveguide is disposed inside an adjacent waveguide, coupling efficiency may be reduced or the manufacturing accuracy may be reduced. Therefore, as shown in FIGS. 4 to 6, it is preferable that the side ends (side surfaces flush with each other) 11c and 12c matching each other be located on the inside and the step portions 11d and 12d face outward.

In FIG. 3, in the optical waveguide having a stepped core, the stepped core is formed not only in the input side optical waveguide 11 of the directional coupler 13 but also up to the curved waveguides 14 and 16 before and after the input side optical waveguide 11.

When connecting the optical waveguide of the stepped core to the optical waveguide of the rectangular core, it is preferable to provide an optical waveguide in which the widths of the lower core and the upper core become equal gradually. The optical waveguide in which the widths of the lower core and the upper core become equal gradually may be provided in the linear portion (outside the range shown in FIG. 3) of one end of the curved waveguides 14 and 16, or may be provided in the middle of the curved waveguides 14 and 16.

In the optical waveguide element 10 shown in FIG. 3, the fundamental TE mode is input to the curved waveguide 14, and the fundamental TE mode is converted to the fundamental TM mode by the directional coupler 13. As a result, the fundamental TE mode input to the curved waveguide 15 and the converted fundamental TM mode are multiplexed, and the result is output to the curved waveguide 17. In this case, it is possible to simultaneously perform polarization conversion and polarization beam combination. When the polarization conversion device is used as a polarization beam combiner, it is preferable that the absolute value of the difference between the effective refractive index of the TE mode guided through the input side optical waveguide 11 and the effective refractive index of the fundamental TE mode guided through the output side optical waveguide 12 be equal to or greater than 0.2.

In the element that simultaneously performs polarization conversion and polarization beam combination, when light of the mode having the same polarization direction is input to two optical waveguides, light transmitted through one optical waveguide in a directional coupler is coupled to the mode having a different polarization direction in the other optical waveguide. As a result, in the other optical waveguide, it is possible to output a polarization multiplexing signal obtained by the simultaneous transmission of two modes having different polarization directions. An input mode is preferably a fundamental TE mode, but can also be other modes.

In FIG. 3, a stepped core is used only for the optical waveguide 11 as shown in FIG. 4. However, even if the stepped core is used for the other optical waveguide 12 as shown in FIGS. 5 and 6, it is possible to simultaneously realize polarization conversion and polarization beam combination.

In the optical waveguide element 10 shown in FIG. 3, a polarization multiplexing signal based on the simultaneous transmission of the fundamental TE mode and the fundamental TM mode is input to the curved waveguide 17, and the signal of the fundamental TM mode is converted to the fundamental TE mode by the directional coupler 13 and the result is output to the curved waveguide 14. When the signal of the fundamental TE mode is output to the curved waveguide 15 without being coupled by the directional coupler 13, it is possible to simultaneously perform polarization conversion and polarization beam splitting.

In the element that simultaneously performs polarization conversion and polarization beam splitting, when a polarization multiplexing signal based on the simultaneous transmission of two modes having different polarization directions is input, one mode transmitted through one optical waveguide in the directional coupler is coupled to the other mode having a different polarization direction in the other optical waveguide. As a result, it is possible to output the modes having the same polarization direction from two optical waveguides. An output mode is preferably a fundamental TE mode, but can also be other modes.

In FIG. 3, a stepped core is used only for the optical waveguide 11 as shown in FIG. 4. However, even if the stepped core is used for the other optical waveguide 12 as shown in FIGS. 5 and 6, it is possible to simultaneously realize polarization conversion and polarization beam splitting.

(DP-QPSK Modulator)

Figure 7:
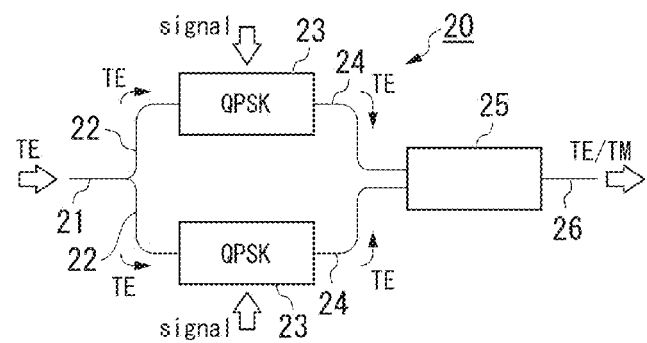
FIG. 7 is a schematic diagram showing an example of a DP-QPSK modulator.

The polarization conversion device according to the present embodiment can be used for Dual Polarization-Quadrature Phase Shift Keying (DP-QPSK) disclosed in Reference Document 1 (P. Dong, C. Xie, L. Chen, L. L. Buhl, and Y.-K. Chen, "112-Gb/s Monolithic PDM-QPSK modulator in Silicon", European Conference and Exhibition on Optical Communication, Vol. 1, p. Th.3.B.1, Jun. 16, 2012). FIG. 7 schematically shows an example of the DP-QPSK modulator. In a DP-QPSK modulator 20, two modes of the fundamental TE mode and the fundamental TM mode can be present for a normal optical waveguide. Using this, the DP-QPSK modulator 20 performs DP-QPSK modulation having a QPSK signal that is independent of both modes of the fundamental TE mode/fundamental TM mode. Specifically, light that is input from an input section 21 in the fundamental TE mode is branched into two optical waveguides 22, 22 and two QPSK modulators 23 modulate the light to each QPSK signal. Then, the fundamental TE mode of one optical waveguide 24 is converted into the fundamental TM mode by the polarization conversion device 25, two modes are combined on the same optical waveguide by polarization beam combination, and a signal independent of the fundamental TE mode and the fundamental TM mode is output to an output section 26.

For example, the polarization conversion device of the embodiment shown in FIG. 3 can be used as the polarization conversion device 25 that converts one fundamental TE mode to the fundamental TM mode and are multiplexes the converted fundamental TE mode and the other fundamental TE mode. For example, the curved waveguides 14 and 15 shown in FIG. 3 correspond to two optical waveguides 24 shown in FIG. 7, and the curved waveguide 17 shown in FIG. 3 corresponds to the output section 26 shown in FIG. 7.

The method of modulating the fundamental TE mode is not limited to QPSK, and even other modulators having a complex configuration can perform polarization multiplexing using the polarization conversion device according to the present embodiment.

(Polarization Diversity Coherent Receiver)

Figure 8:
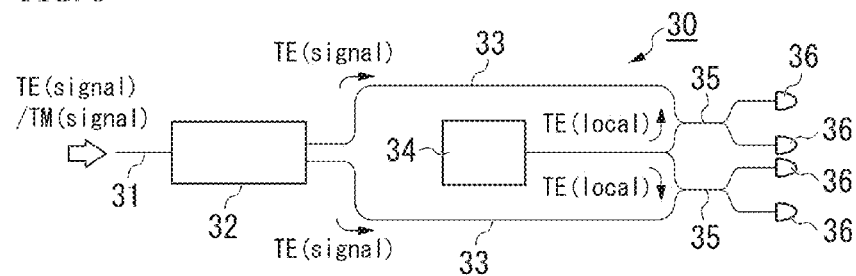
FIG. 8 is a schematic diagram showing an example of a polarization diversity coherent receiver.

The polarization conversion device according to the present embodiment can be used in a coherent receiver on the Si optical waveguide of the polarization multiplexing signal based on the simultaneous transmission of the fundamental TE mode and the fundamental TM mode, which is disclosed in Reference Document 2 (C. Doerr et al., "Packaged Monolithic Silicon 112-Gb/s Coherent Receiver", IEEE Photonics Technology Letters, Vol. 23, pp. 762-764, 2011). FIG. 8 schematically shows an example of the polarization diversity coherent receiver. In a coherent receiver 30, an optical waveguide 31 of the polarization multiplexing signal based on the simultaneous transmission of the fundamental TE mode and the fundamental TM mode is connected to a polarization conversion device 32 that can simultaneously perform polarization conversion and polarization beam splitting. In addition, a signal of the fundamental TE mode is branched into one of two optical waveguides 33, and a signal of the fundamental TE mode converted from the fundamental TM mode is branched into the other one of the two optical waveguides 33. A semiconductor laser light source that is generally used as local light 34 uses only single polarization, for example, an output of the fundamental TE mode (local). When such a light source is used, polarization conversion of local light is required in the related art. In the coherent receiver 30 shown in FIG. 8, however, polarization conversion of local light is not required since the signal light necessarily becomes a signal of the fundamental TE mode after polarization separation. The signal light and the local light are output from a coupling section 36 through a light multiplexing section 35.

When using an optical waveguide type structure for the polarization conversion device 32, it is possible to use a coupler that does not have a polarization separation function, such as a reverse tapered mode field converter coupled from the substrate side, for the coupling of light with respect to the outside of the element in the coupling section 36. As a coupler, for example, it is possible to use a reverse tapered structure disclosed in Reference Document 3 (Qing Fang, et al., "Suspended optical fiber-to-waveguide mode size converter for silicon photonics", Optics Express, Vol. 18, Issue 8, pp. 7763-7769 (2010)).

(Polarization Diversity Scheme)

Figure 9:
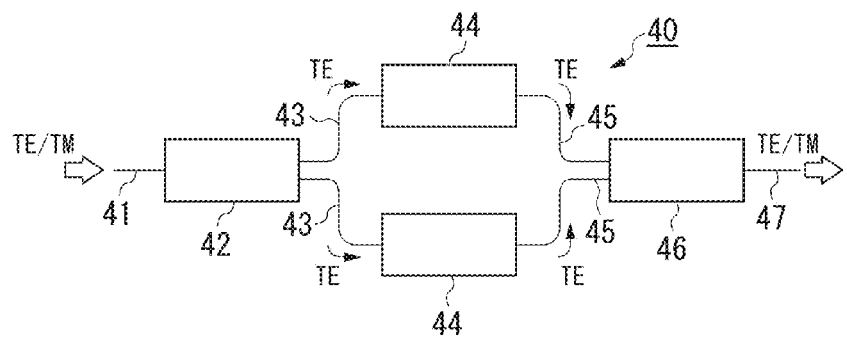
FIG. 9 is a schematic diagram showing an example of the polarization diversity scheme.

The polarization conversion device according to the present embodiment can be used to perform the polarization diversity scheme as shown in FIG. 9. This scheme can be used to apply the same operation to both modes when performing polarization multiplexing transmission, in which the fundamental TE mode and the fundamental TM mode are simultaneously transmitted, and when a single polarized wave is transmitted at random, which is disclosed in Reference Document 4 (Hiroshi Fukuda et al., "Silicon photoniccircuit with polarization diversity", Optics Express, Vol. 16, Issue 7, pp. 4872-4880 (2008)). In a polarization diversity scheme 40 shown in FIG. 9, an optical waveguide 41, through which the polarization multiplexing signal based on the simultaneous transmission of the fundamental TE mode and the fundamental TM mode is transmitted, is connected to a polarization conversion device 42 that can simultaneously perform polarization conversion and polarization beam splitting. In addition, a signal of the fundamental TE mode is transmitted to one of two optical waveguides 43 branched from the polarization conversion device 42, and a signal of the fundamental TE mode converted from the fundamental TM mode is transmitted to the other one of the two optical waveguides 43, 43. The signal light of two fundamental TE modes operated in an element 44 connected to the waveguide branched from the polarization conversion device 42 is combined by a polarization conversion device 46 through an optical waveguide 45. Then, the polarization multiplexing signal based on the simultaneous transmission of the fundamental TE mode and the fundamental TM mode converted from the fundamental TE mode is output to an optical waveguide 47.

Similar to the polarization diversity coherent receiver shown in FIG. 8, the polarization conversion device of the invention that can simultaneously perform polarization conversion and polarization beam splitting can be used as the polarization conversion device 42.

Similar to the DP-QPSK modulator shown in FIG. 7, the polarization conversion device according to the present embodiment that can simultaneously perform polarization conversion and polarization beam combination can be used as the polarization conversion device 46.

While the invention has been described based on preferred embodiments, the invention is not limited to the above embodiments, and various modifications can be made without departing from the scope of the invention.

In the directional coupler used in the invention, the input side optical waveguide and the output side optical waveguide can be arranged in any direction, for example, in a direction perpendicular to the top surface of the substrate. In this case, in a cross section perpendicular to the light guiding direction, the size in the direction in which the input side optical waveguide and the output side optical waveguide face each other is set to be the width, and the size in a direction perpendicular to the facing direction is set to be the height. That is, when two optical waveguides face each other vertically with respect to the top surface of the substrate, the size in a direction perpendicular to the substrate is set to be the "width", and a size in a direction parallel to the substrate is set to be the "height".

In an optical waveguide having a rectangular core of a directional coupler, it is preferable that a tapered optical waveguide having a width that changes gradually be disposed at one or both ends in the longitudinal direction. In this case, the optical waveguide of the rectangular core having a width suitable for the directional coupler can be connected to an external optical waveguide of a rectangular core having an appropriate width with low loss.

EXAMPLES

Hereinafter, the invention will be specifically described by way of examples.

First Example

FIGS. 3 and 4 show the structure of this example. FIG. 3 shows a diagram when viewed from above, and FIG. 4 shows a cross section perpendicular to the guiding direction in a directional coupler. An optical waveguide element in this example is manufactured based on a silicon on insulator (SOI) substrate formed of Si—$SiO_2$—Si. An intermediate $SiO_2$ layer is used as a lower clad, and an upper Si layer is used as a core. After forming the core, $SiO_2$ is provided as an upper clad. The refractive index of $SiO_2$ that was a material of the clad was set to 1.44, and the refractive index of Si that was a material of the core was set to 3.48.

In FIG. 4, the cross-sectional size of the core of the input side optical waveguide 11 was set such that the height Hb1 of the upper core 11b was 125 nm, the width Wb1 of the upper core 11b was 200 nm, the height Ha1 of the lower core 11a was 95 nm, the width Wa1 of the lower core 11a was 300 nm, and the height H1 of the entire core was 220 nm. The cross-sectional size of the core of the output side optical waveguide 12 was set such that the height H2 of the core was 220 nm and the width W2 was 336 nm. A distance between the directional coupler 13 of the input side optical waveguide and the directional coupler 13 of the output side optical waveguide was set to 250 nm.

Across the longitudinal direction of the optical waveguide, the cross section of the core shape at any position has the same shape as in FIG. 4, and the size of the core shape at any position is also the same. In the directional coupler 13, the two optical waveguides 11 and 12 are parallel to each other. The length L of the directional coupler 13 was set to 3 μm.

The curved waveguides 14, 15, 16, and 17 are provided before and after the directional coupler 13, and two optical waveguides are made to be close to each other near the directional coupler 13. Each curved waveguide is an S-shaped curve obtained by connecting two arcs having a radius of curvature of 70 μm and a bending angle of 7.5°. The range of one arc is indicated by reference numeral C. A distance from the end of the curved waveguide 15 to the end of the curved waveguide 17 was about 44 μm. An electric field was calculated when the wavelength of light was set to 1.55 μm and the fundamental TE mode was guided through the input side optical waveguide having the stepped core of the first example. As a result, the Ex component is shown in FIG. 10A, and the Ey component is shown in FIG. 10B. The coupling constant was 0.145 rad/μm. In this case, the effective refractive index $n_{eff}$ was about 1.625665. The effective refractive index of the fundamental TM mode guided through the output side optical waveguide having the rectangular core of the first example was about 1.625892, which was almost the same as the effective refractive index ($n_{eff}$=1.625665) of the fundamental TE mode guided through the input side optical waveguide having a stepped core. In this case, δ(refer to Formula (1)) described above becomes 0.000460 rad/μm, which is sufficiently small compared with the coupling constant of 0.145 rad/μm. Accordingly, it can be seen that the above condition is sufficient to realize the function of polarization conversion.

As a comparison, using an optical waveguide having a rectangular core (300 nm in width and 220 nm in height) that has the same width as the input side optical waveguide of the first example, instead of the input side optical waveguide of the first example, an electric field when the fundamental TE mode was guided through the optical waveguide was calculated. As a result, the Ex component is shown in FIG. 11A, and the Ey component is shown in FIG. 11B. In this case, the effective refractive index $n_{eff}$ was about 1.820082, that is, about 1.82008.

From the comparison between FIGS. 10A and 10B and FIGS. 11A and 11B, it can be seen that the amount of Ey component (in the fundamental TE mode, a component perpendicular to the main electric field component) has increased in the case of the stepped core. Therefore, by increasing the coupling efficiency by forming a stepped core in the input side optical waveguide 11, it is possible to increase the polarization conversion efficiency.

For comparison, a coupling constant when trying to perform polarization conversion with a directional coupler using the above-described rectangular core (300 nm in width and 220 nm in height) is shown. A case is considered in which a rectangular core on the output side is disposed in parallel to the above-described rectangular core and the fundamental TE mode of the input side optical waveguide is converted to the fundamental TM mode of the output side optical waveguide. The size of the rectangular core of the output side optical waveguide was set such that the width was 591 nm and the height was 220 nm. In this case, the effective refractive index of the fundamental TM mode of the output side optical waveguide was about 1.81988, which was almost the same as the effective refractive index (1.82008) of the fundamental TE mode of the output side optical waveguide. In this case, δ was 0.000404 rad/μm. In addition, a distance between the waveguides in the width direction was set to 250 nm as in the structure of the first example. In this case, the coupling constant was 0.0420 rad/μm. In the case of the structure of the first example, the coupling constant was 0.145 rad/μm. Therefore, it can be seen that the coupling constant can be greatly increased by forming the stepped core.

FIG. 12A shows a value of the Ey component of the electric field at a location, which is 1 μm from the center (X=0) in the +X axis direction (width direction), in the stepped core of FIGS. 10A and 10B. FIG. 12B shows a value of the Ey component of the electric field at a location, which is 1 μm from the center (X=0) in the +X axis direction (width direction), in the rectangular core of FIGS. 11A and 11B.

In the rectangular core shape, as shown in FIG. 12B, the maximum value of the Ey component is about $\pm 7 \times 10^{-4}$. In contrast, in the stepped core shape, as shown in FIG. 12B, the maximum value of the Ey component is about 0.01, which is larger than the value of the rectangular core shape. As described above, the value of the electric field component is a value normalized by the maximum amplitude of the main electric field component (here, Ex component). From this, it can be seen that, in the case of the stepped core shape, the electric field is widely distributed at a position away from the center, and accordingly, coupling to the adjacent waveguide is increased.

Figure 13:
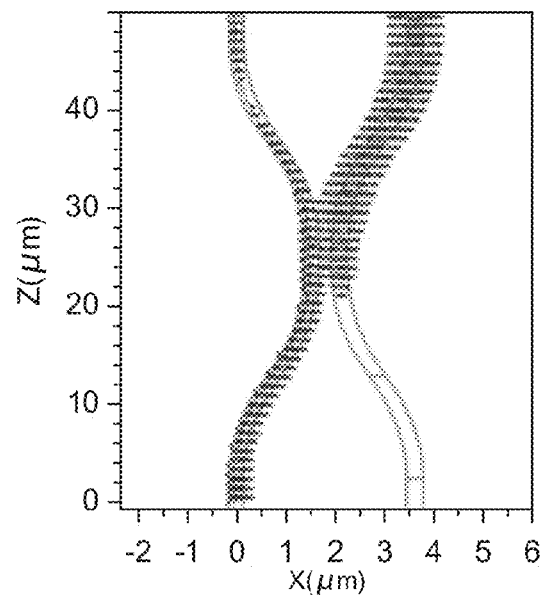
FIG. 13 shows a simulation result that shows a change in the Ey component when inputting the fundamental TE mode to the input side optical waveguide in the first example.

The polarization conversion efficiency of the polarization conversion device in this example was calculated using electromagnetic field simulation based on a finite-difference time domain (FDTD) method. FIG. 13 shows a state of change in the Ey component of the electric field when inputting the fundamental TE mode to the input side optical waveguide 11. From FIG. 13, it can be seen that the fundamental TE mode propagating through the input side optical waveguide has a large Ey component and the fundamental TE mode is coupled to the fundamental TM mode of the adjacent optical waveguide. As a result, the polarization conversion efficiency (equivalent to the coupling efficiency) becomes −0.75 dB in terms of a ratio of (fundamental TM mode power on the output side)/(fundamental TE mode power on the input side). Therefore, it can be seen that it is possible to perform polarization conversion with high efficiency in the polarization conversion device of this example.

Figure 14:
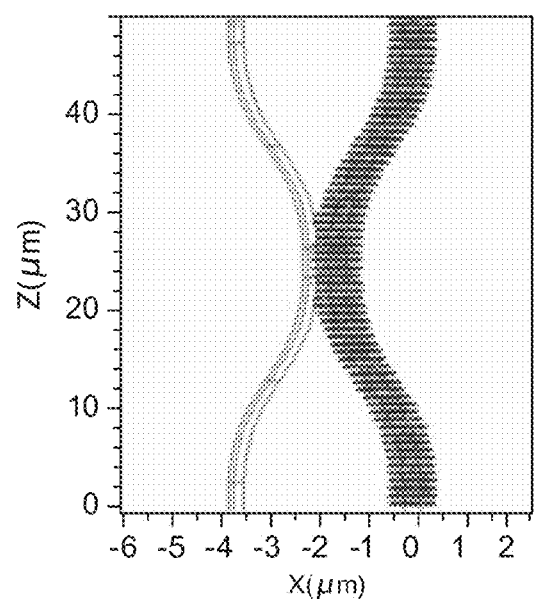
FIG. 14 shows a simulation result that shows a change in the Ex component when inputting the fundamental TE mode to the output side optical waveguide in the first example.

On the other hand, when inputting the fundamental TE mode (will be written as a fundamental TE mode') from a side that is not the output end of the output side optical waveguide 12, there is a large difference between the effective refractive index of the fundamental TE mode of the input side optical waveguide 11 and the effective refractive index of the fundamental TE mode' of the output side optical waveguide 12. Therefore, the coupling efficiency is very small. FIG. 14 shows a result when a state of change in the Ex component of the electric field when inputting the fundamental TE mode' to the output side optical waveguide 12 is simulated based on the FDTD method. From FIG. 14, it can be seen that the fundamental TE mode' is transmitted through the output side optical waveguide 12 without being almost coupled to the input side optical waveguide 11. According to the calculation result of FDTD, it can be seen that the ratio of the power of the output fundamental TE mode' to the power of the input fundamental TE mode' is −0.08 dB, and accordingly, the fundamental TE mode' is transmitted with little loss. According to this example, not only can a function as a polarization conversion device be realized, but also a function as an element that converts one of two input fundamental TE modes to the fundamental TM mode and couples the converted fundamental TM mode to the other fundamental TE mode can be realized.

In addition, the effective refractive index of the fundamental TE mode (fundamental TE mode') guided through the output side optical waveguide is about 1.98712, and the absolute value of the difference from the effective refractive index ($n_{eff}$=1.625665) of the fundamental TE mode guided through the input side optical waveguide is 0.2 or more. Therefore, it can be seen that this is sufficient to have a function as a polarization beam combiner.

Second Example

An optical waveguide element in which the output side optical waveguide 12 had a stepped core and the input side optical waveguide 11 had a rectangular core as shown in FIG. 5 was manufactured using the same method as in the first example. The cross-sectional size of the core of the input side optical waveguide 11 was set such that the height H1 of the core was 220 nm and the width W1 was 282 nm. The cross-sectional size of the core of the output side optical waveguide 12 was set such that the height Hb2 of the upper core 12b was 125 nm, the width Wb2 of the upper core 12b was 420 nm, the height Ha2 of the lower core 12a was 95 nm, the width Wa2 of the lower core 12a was 600 nm, and the height H2 of the entire core was 220 nm. A distance between the input side optical waveguide and the output side optical waveguide in the width direction was 400 nm, and the coupling constant was 0.0315 rad/μm.

Figure 15A:
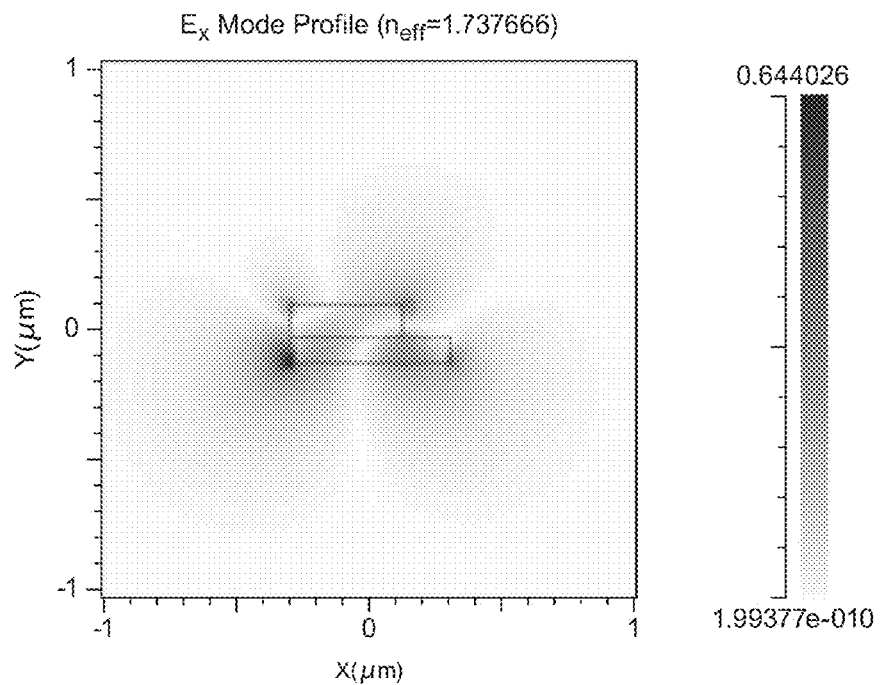
FIG. 15A shows a simulation result that shows an Ex component of the electric field when the fundamental TM mode is guided through an output side optical waveguide having a stepped core of a second example.
Figure 15B:
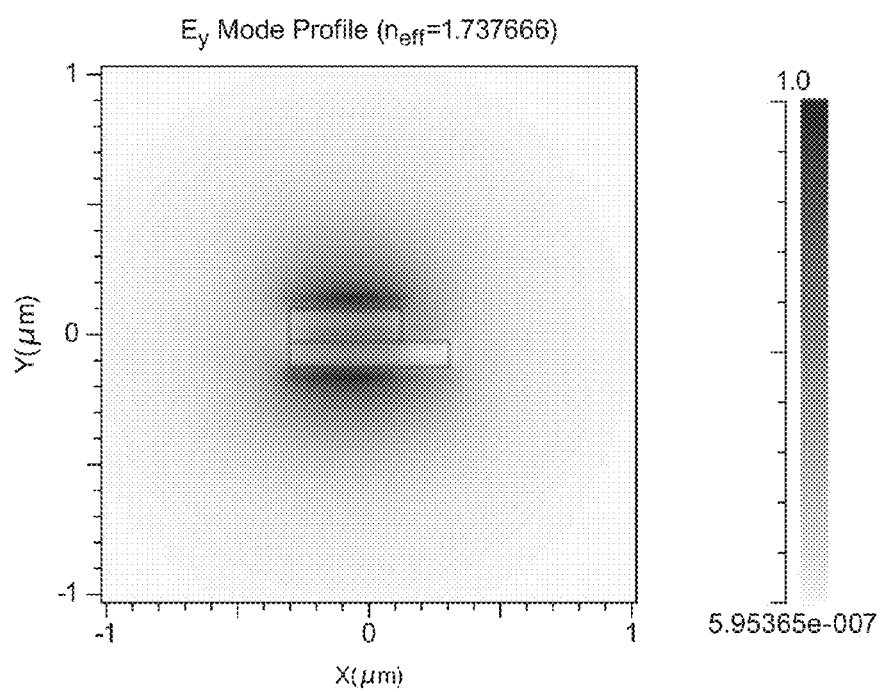
FIG. 15B shows a simulation result that shows an Ey component of the electric field when the fundamental TM mode is guided through the output side optical waveguide having a stepped core of the second example.

An electric field when the fundamental TM mode was guided through the output side optical waveguide having a stepped core of the second example was calculated. As a result, the Ex component is shown in FIG. 15A, and the Ey component is shown in FIG. 15B. In this case, the effective refractive index $n_{eff}$ is about 1.737666.

In addition, the effective refractive index of the fundamental TE mode guided through the input side optical waveguide having a rectangular core of the second example was about 1.733459. Therefore, the effective refractive index of the input side optical waveguide having a rectangular core is almost the same as the effective refractive index ($n_{eff}$=1.737666) of the output side optical waveguide having a stepped core. In the second example, since δ is 0.00853 rad/μm, δ is sufficiently small compared with the coupling constant of 0.0315 rad/μm. Accordingly, it can be seen that the above condition is sufficient to realize the function of polarization conversion.

Figure 16A:
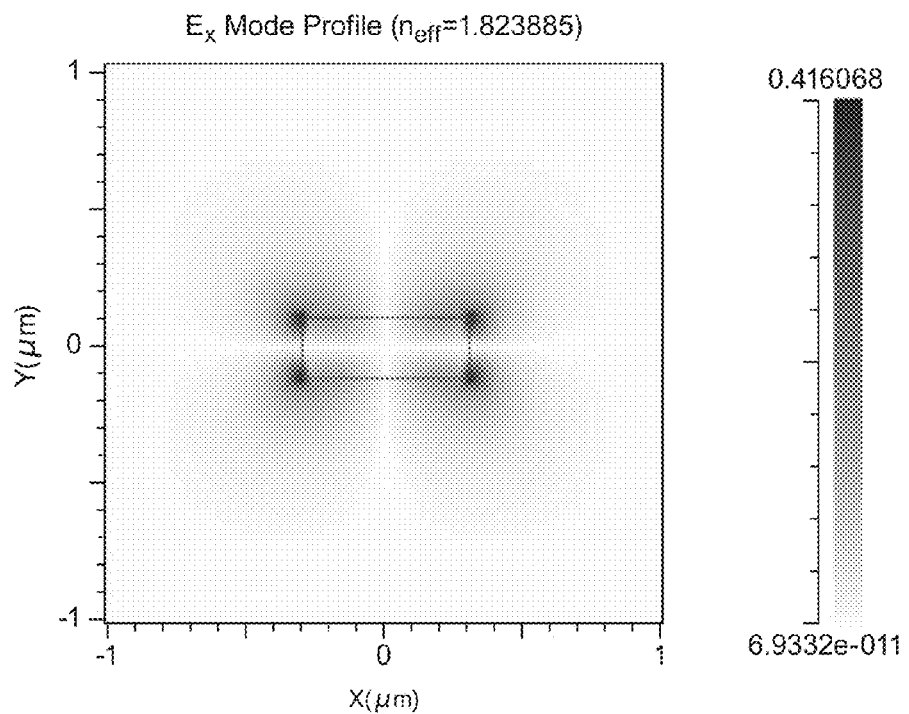
FIG. 16A shows a simulation result that shows an Ex component of the electric field when the fundamental TM mode is guided through an optical waveguide having a rectangular core with the same width as the output side optical waveguide of the second example.
Figure 16B:
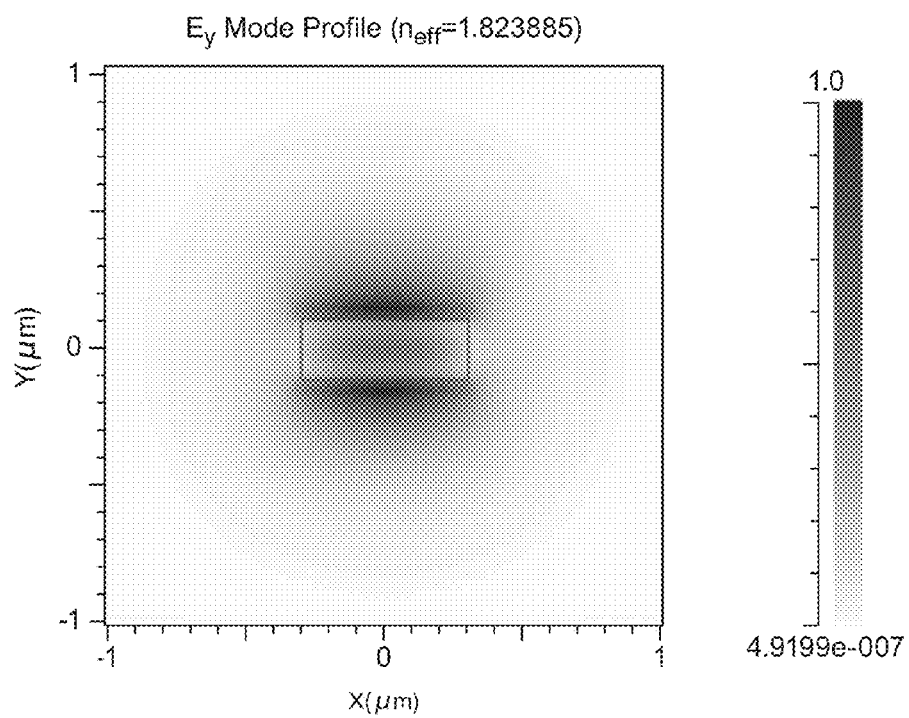
FIG. 16B shows a simulation result that shows an Ey component of the electric field when the fundamental TM mode is guided through the optical waveguide having a rectangular core with the same width as the output side optical waveguide of the second example.

As a comparison, an electric field when the fundamental TM mode was guided through an optical waveguide having a rectangular core (600 nm in width and 220 nm in height), which had the same width as the output side optical waveguide of the second example, was calculated. As a result, the Ex component is shown in FIG. 16A, and the Ey component is shown in FIG. 16B. In this case, the effective refractive index $n_{eff}$ was about 1.823885, that is, about 1.82389.

From the comparison between FIGS. 15A and 15B and FIGS. 16A and 16B, it can be seen that the amount of Ex component (in the fundamental TM mode, a component perpendicular to the main electric field component) has increased in the case of the stepped core. Therefore, even if the output side optical waveguide 12 is formed to have a stepped core, it is possible to increase the polarization conversion efficiency by increasing the coupling efficiency, in the same manner as in the first example.

For comparison, a coupling constant when trying to perform polarization conversion with a directional coupler using the above-described rectangular core (600 nm in width and 220 nm in height) is shown. A rectangular core is disposed in parallel to the above-described rectangular core (600 nm in width and 220 nm in height), and a coupling between the former fundamental TE mode and the latter fundamental TE mode is considered. The size of the latter rectangular core was set such that the width was 301 nm and the height was 220 nm. In this case, the effective refractive index of the latter fundamental TE mode was about 1.82486, which was almost the same as the effective refractive index (1.82389) of the latter fundamental TE mode. In this case, δ was 0.00198 rad/μm. In addition, a distance between the waveguides in the width direction was set to 400 nm as in the structure of the second example. In this case, the coupling constant was 0.0123 rad/μm. In the case of the structure of the second example, the coupling constant was 0.0315 rad/μm. Therefore, it can be seen that the coupling constant can be increased by forming the stepped core.

Third Example

An optical waveguide element in which both the input side optical waveguide 11 and the output side optical waveguide 12 had a stepped core as shown in FIG. 6 was manufactured using the same method as in the first example. As in the first example, the cross-sectional size of the core of the input side optical waveguide 11 was set such that the height Hb1 of the upper core 11b was 125 nm, the width Wb1 of the upper core 11b was 200 nm, the height Ha1 of the lower core 11a was 95 nm, the width Wa1 of the lower core 11a was 300 nm, and the height H1 of the entire core was 220 nm. The cross-sectional size of the core of the output side optical waveguide 12 was set such that the height Hb2 of the upper core 12b was 125 nm, the width Wb2 of the upper core 12b was 304 nm, the height Ha2 of the lower core 12a was 95 nm, the width Wa2 of the lower core 12a was 608 nm, and the height H2 of the entire core was 220 nm. In case that the distance between the input side optical waveguide and the output side optical waveguide in the width direction is 250 nm, the coupling constant is 0.154 rad/μm.

Figure 17A:
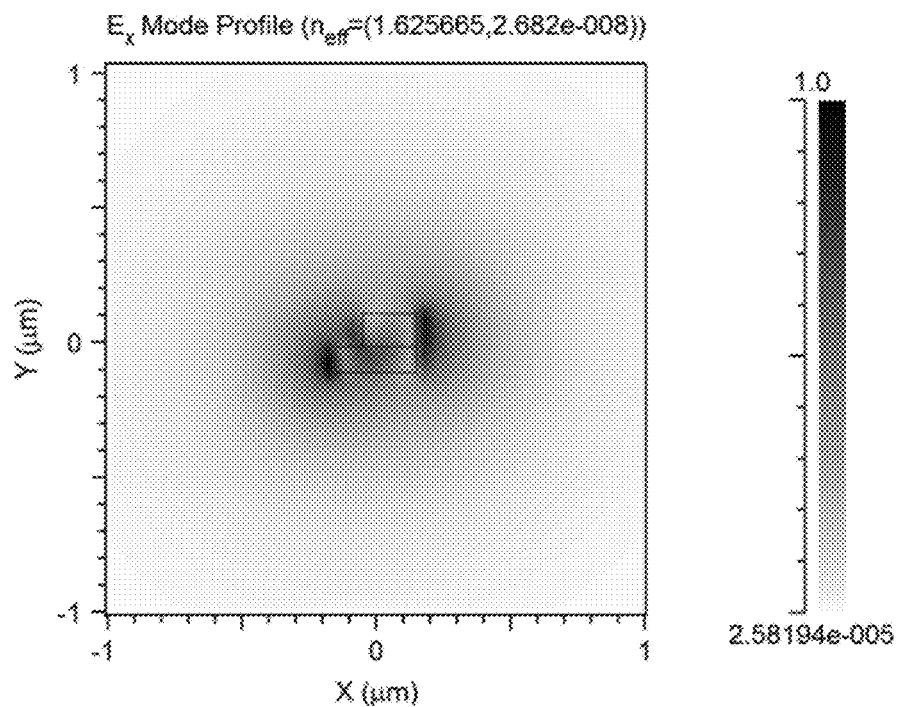
FIG. 17A shows a simulation result that shows an Ex component of the electric field when inputting the fundamental TE mode to an input side optical waveguide having a stepped core of a third example.
Figure 17B:
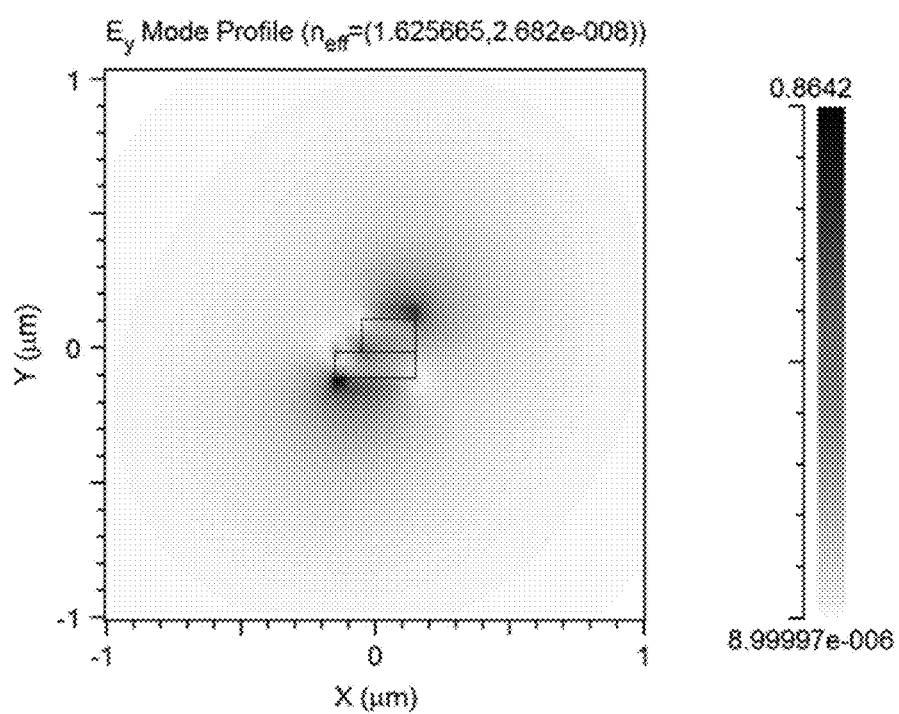
FIG. 17B shows a simulation result that shows an Ey component of the electric field when inputting the fundamental TE mode to the input side optical waveguide having a stepped core of the third example.

An electric field when the fundamental TE mode was guided through the input side optical waveguide having a stepped core of the third example was calculated. As a result, the Ex component is shown in FIG. 17A, and the Ey component is shown in FIG. 17B. The effective refractive index $n_{eff}$ was about 1.625665. Since the refractive index cross section (shape and size) of the input side optical waveguide is the same as that in the first example, results shown in FIGS. 17A and 17B are the same as those shown in FIGS. 10A and 10B.

Figure 18A:
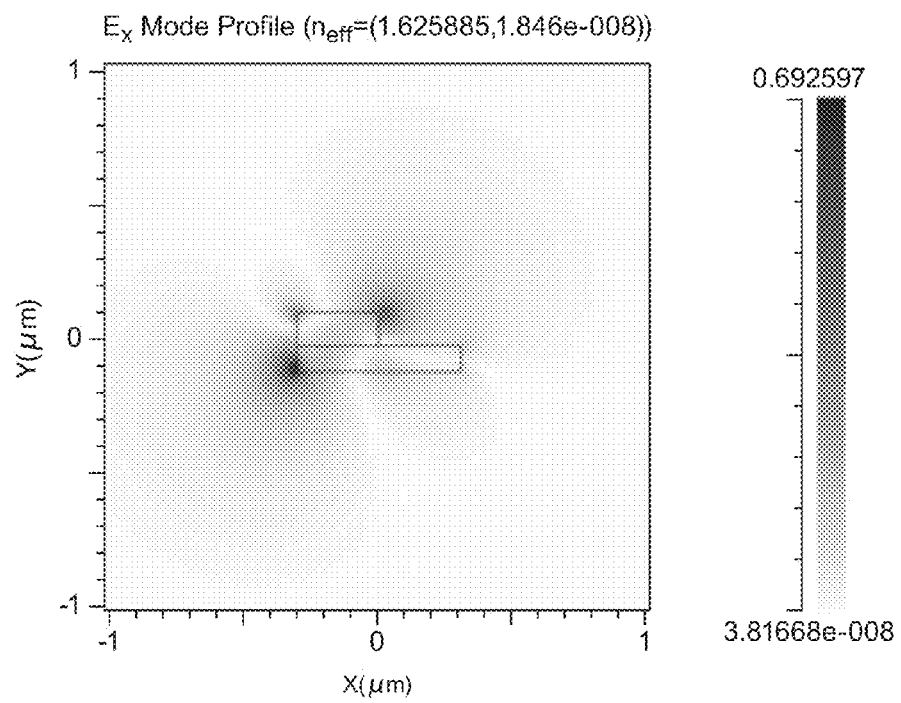
FIG. 18A shows a simulation result that shows an Ex component of the electric field when the fundamental TM mode is guided through an output side optical waveguide having a stepped core of the third example.
Figure 18B:
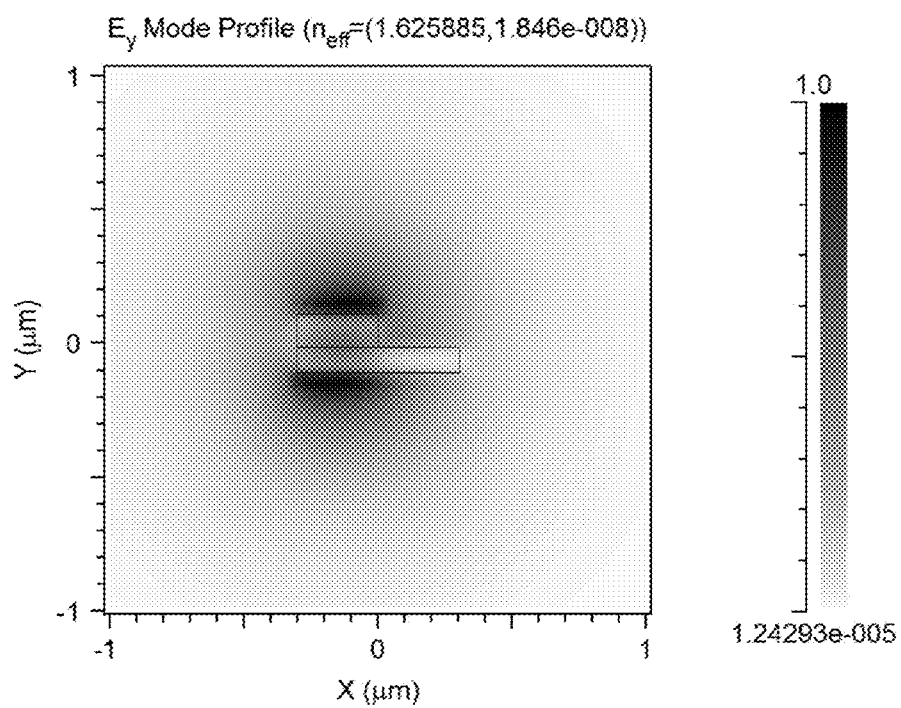
FIG. 18B shows a simulation result that shows an Ey component of the electric field when the fundamental TM mode is guided through the output side optical waveguide having a stepped core of the third example.

An electric field when the fundamental TM mode was guided through the output side optical waveguide having a stepped core of the third example was calculated. As a result, the Ex component is shown in FIG. 18A, and the Ey component is shown in FIG. 18B. The effective refractive index $n_{eff}$ is about 1.625885.

The effective refractive index ($n_{eff}$=1.625665) of the fundamental TE mode of the input side optical waveguide is almost the same as the effective refractive index ($n_{eff}$=1.625885) of the fundamental TM mode of the output side optical waveguide. In this case, since δ is 0.000446 rad/μm, δ is sufficiently small compared with the coupling constant of 0.154 rad/μm. Accordingly, it can be seen that the above condition is sufficient to realize the function of polarization conversion.

Since both the optical waveguides have a stepped core, the amount of Ex component is increased in the input side optical waveguide through which the fundamental TM mode is guided, and the amount of Ey component is increased in the output side optical waveguide through which the fundamental TE mode is guided, as in the first and second examples. As a result, a structure to rotate both the modes is obtained. Therefore, by increasing the coupling efficiency as in the first and second examples or more than that in the first and second examples, it is possible to increase the polarization conversion efficiency. In practice, in the first and third examples in which the distance (250 nm) between the optical waveguides was the same and the width (300 nm) of the input side optical waveguide was the same, χ was 0.145 rad/μm in the first example in which only one optical waveguide had a stepped core. In contrast, in the third example in which both optical waveguides had a stepped core, χ was 0.154 rad/μm. Therefore, it can be seen that the coupling constant χ is increased in the third example.

First Comparative Example

As in Non-patent Document 1, an optical waveguide element in which both an input side optical waveguide and an output side optical waveguide had a rectangular core was manufactured using the same method as in the first example.

The cross-sectional size of the core of the input side optical waveguide was set such that the width was 600 nm and the height was 250 nm. The cross-sectional size of the core of the output side optical waveguide was set such that the width was 333 nm and the height was 250 nm. After forming the core, an upper clad formed of $SiO_2$ was provided. That is, both the upper clad and the lower clad were formed of $SiO_2$, unlike Non-patent Document 1.

Figure 19A:
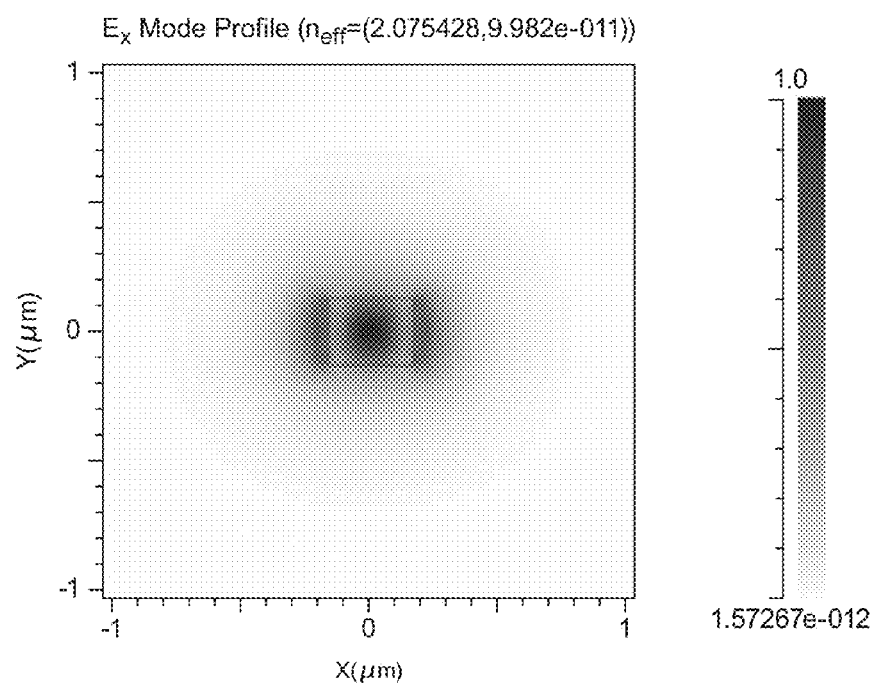
FIG. 19A shows a simulation result that shows an Ex component of the electric field when inputting the fundamental TE mode to an input side optical waveguide having a rectangular core of a first comparative example.
Figure 19B:
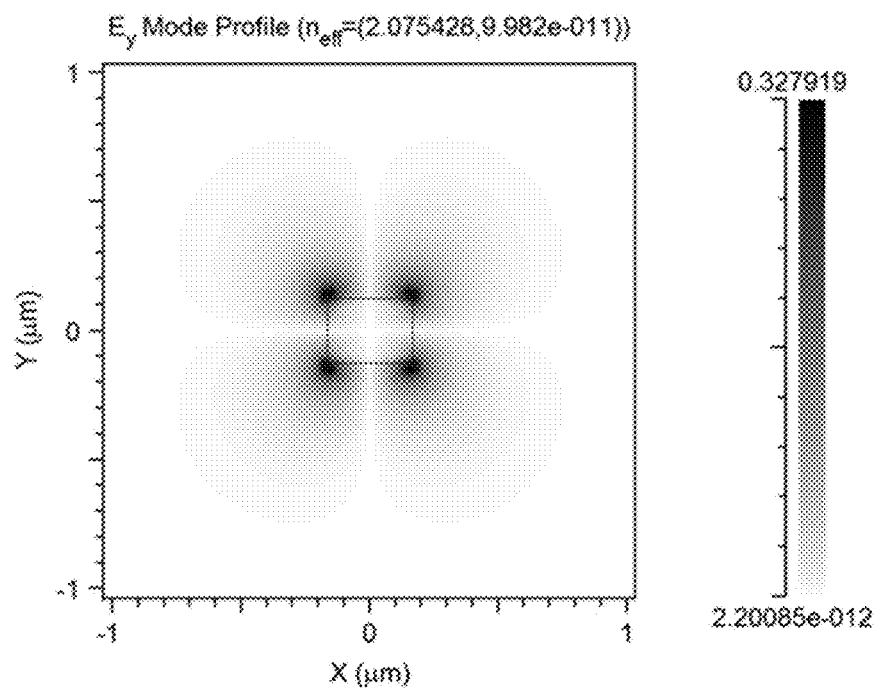
FIG. 19B shows a simulation result that shows an Ey component of the electric field when inputting the fundamental TE mode to the input side optical waveguide having a rectangular core of the first comparative example.

An electric field when the fundamental TE mode was guided through the input side optical waveguide of the first comparative example was calculated. As a result, the Ex component is shown in FIG. 19A, and the Ey component is shown in FIG. 19B. The effective refractive index $n_{eff}$ is about 2.075428. Since a refractive index cross section is not vertically symmetrical, the rotation of the electric field of the fundamental TE mode is not occurred almost.

Second Comparative Example

As in Non-patent Document 1, an optical waveguide element in which both an input side optical waveguide and an output side optical waveguide had a rectangular core was manufactured using the same method as in the first example. The cross-sectional size of the core of the input side optical waveguide was set such that the width was 600 nm and the height was 250 nm. The cross-sectional size of the core of the output side optical waveguide was set such that the width was 333 nm and the height was 250 nm. Here, the process of providing an upper clad after forming a core was omitted, and the material of the upper clad was air and the material of the lower clad was $SiO_2$.

Figure 20A:
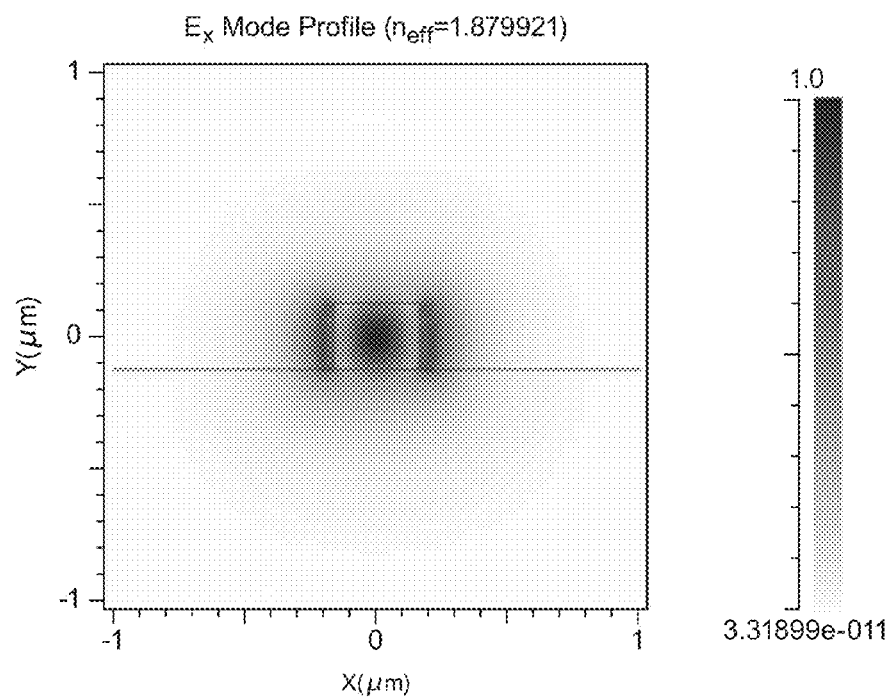
FIG. 20A shows a simulation result that shows an Ex component of the electric field when inputting the fundamental TE mode to an input side optical waveguide having a rectangular core of a second comparative example.
Figure 20B:
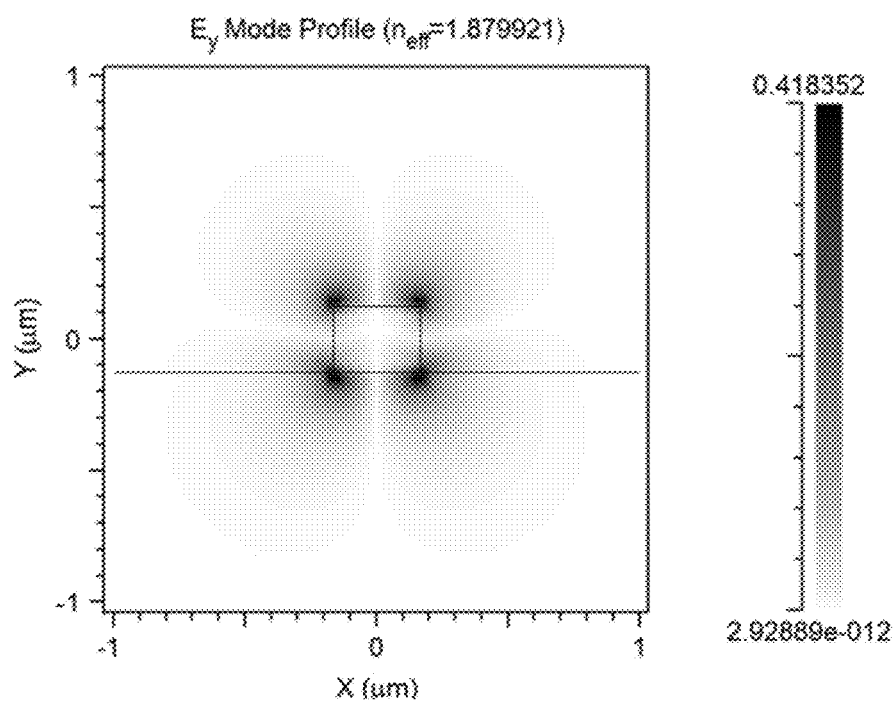
FIG. 20B shows a simulation result that shows an Ey component of the electric field when inputting the fundamental TE mode to the input side optical waveguide having a rectangular core of the second comparative example.

An electric field when the fundamental TE mode was guided through the input side optical waveguide of the second comparative example was calculated. As a result, the Ex component is shown in FIG. 20A, and the Ey component is shown in FIG. 20B. The effective refractive index $n_{eff}$ is about 1.879921. Due to the vertical asymmetry of the clad, the number of Ey component is increased, and the electric field of the fundamental TE mode rotates.

Also when the fundamental TM mode is guided through the output side optical waveguide of the second comparative example, the number of Ey component is increased and the electric field of the fundamental TE mode rotates due to the vertical asymmetry of the clad. Thus, by rotating two modes whose main electric fields are perpendicular to each other using the refractive index cross section that is vertically asymmetrical, coupling efficiency between the waveguides is increased. However, since the optical waveguide is exposed during the manufacturing process, the characteristics are degraded due to adhesion of foreign matter. As a result, the yield is reduced.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A polarization conversion device, comprising:
   a directional coupler that includes an input side optical waveguide and an output side optical waveguide which are disposed in parallel to each other and each of which has a core,
   wherein assuming that a direction in which the input side optical waveguide and the output side optical waveguide face each other is a width direction and a direction perpendicular to the width direction is a height direction in a cross section perpendicular to a longitudinal direction of each of the input side optical waveguide and the output side optical waveguide, a size of the core of the input side optical waveguide in the height direction is the same as a size of the core of the output side optical waveguide in the height direction, the core of at least one of the input side optical waveguide and the output side optical waveguide is configured to include a rectangular lower core and a rectangular upper core which is disposed on the lower core such that one side surface of the upper core and one side surface of the lower core in the width direction are flush with each other and of which a size in the width direction is smaller than that of the lower core, and
   the directional coupler is configured to couple first light guided through the input side optical waveguide to second light guided through the output side optical waveguide, a polarization direction of the second light is perpendicular to that of the first light.

2. The polarization conversion device according to claim 1, wherein the core of one optical waveguide of the input side optical waveguide and the output side optical waveguide is configured to include the lower core and the upper core, and the core of an other optical waveguide is a rectangular core.

3. The polarization conversion device according to claim 2, wherein the side surface that is flush with the lower core and the upper core in the one optical waveguide faces the other optical waveguide.

4. The polarization conversion device according to claim 2, further comprising:
   an optical waveguide that is disposed at least one end of the other optical waveguide in the longitudinal direction and that has a tapered core whose size in the width direction changes gradually.

5. The polarization conversion device according to claim 1, wherein each of the input side optical waveguide and the output side optical waveguide has the core configured to include the lower core and the upper core.

6. The polarization conversion device according to claim 5, wherein the input side optical waveguide and the output side optical waveguide are disposed such that the side surface, which is flush with the lower core and the upper core, in the input side optical waveguide faces the side surface, which is flush with the lower core and the upper core, in the output side optical waveguide.

7. The polarization conversion device according to claim 1, further comprising:
   a curved waveguide disposed at least one end of each of the input side optical waveguide and the output side optical waveguide in the longitudinal direction,
   wherein the curved waveguide connected to the input side optical waveguide and the curved waveguide connected to the output side optical waveguide become closer to each other toward the directional coupler or more separated from each other as a distance from the directional coupler increases.

8. The polarization conversion device according to claim 1, further comprising:
   an optical waveguide which has a core, which is disposed at least one end of the optical waveguide including the lower core and the upper core in the longitudinal direction, and in which widths of the lower core and the upper core become gradually equal.

9. The polarization conversion device according to claim 1, wherein a fundamental TE mode is input to the input side optical waveguide and the output side optical waveguide, and an absolute value of a difference between an effective refractive index of the fundamental TE mode guided through the input side optical waveguide and an effective refractive index of the fundamental TE mode guided through the output side optical waveguide is equal to or greater than 0.2.

10. The polarization conversion device according to claim 1, further comprising:

a substrate that has a top surface on which the input side optical waveguide and the output side optical waveguide are formed, and the input side optical waveguide and the output side optical waveguide are disposed such that the width direction becomes a direction parallel to the top surface of the substrate and the height direction becomes a direction perpendicular to the top surface of the substrate.

11. A DP-QPSK modulator comprising the polarization conversion device according to claim 1.

12. A polarization diversity coherent receiver comprising the polarization conversion device according to claim 1.

13. A polarization diversity scheme comprising the polarization conversion device according to claim 1.

* * * * *